(12) United States Patent
Gibel et al.

(10) Patent No.: US 11,870,233 B2
(45) Date of Patent: Jan. 9, 2024

(54) MOBILE CONDUCTOR LIFT

(71) Applicant: Fritel & Associates, LLC, Waco, TX (US)

(72) Inventors: John Gibel, Waco, TX (US); Daniel Spaulding, Waco, TX (US)

(*) Notice: Subject to any disclaimer, the term of this patent is extended or adjusted under 35 U.S.C. 154(b) by 680 days.

(21) Appl. No.: 16/853,124

(22) Filed: Apr. 20, 2020

(65) Prior Publication Data
US 2020/0335959 A1     Oct. 22, 2020

Related U.S. Application Data

(60) Provisional application No. 62/836,631, filed on Apr. 20, 2019.

(51) Int. Cl.
| | | |
|---|---|---|
| *H02G 7/05* | (2006.01) | |
| *B66C 1/10* | (2006.01) | |
| *B65D 90/16* | (2006.01) | |

(52) U.S. Cl.
CPC ............... *H02G 7/05* (2013.01); *B65D 90/16* (2013.01); *B66C 1/10* (2013.01)

(58) Field of Classification Search
CPC ............ H02G 7/05; B65D 90/16; B66C 1/10
USPC ............................ 294/82.1, 81.2, 81.21, 81.3
See application file for complete search history.

(56) References Cited

U.S. PATENT DOCUMENTS

| | | | | |
|---|---|---|---|---|
| 2,622,540 A | * | 12/1952 | Stewart ..................... | B66C 1/18 414/800 |
| 3,146,016 A | * | 8/1964 | Daymon, Jr. ............. | B66C 1/62 294/81.5 |
| 4,728,138 A | * | 3/1988 | Samuelsson ............. | B66D 3/10 294/82.12 |
| 4,973,795 A | * | 11/1990 | Sharpe ..................... | H02G 1/02 174/40 R |
| 2008/0237956 A1 | * | 10/2008 | Difford ................. | B66C 1/0256 269/21 |
| 2010/0148528 A1 | * | 6/2010 | Emond ................... | B66C 1/625 294/67.33 |
| 2015/0030426 A1 | * | 1/2015 | Fritel ..................... | B66C 23/88 294/174 |
| 2016/0336727 A1 | * | 11/2016 | Carreira .................. | H02G 7/20 |

* cited by examiner

*Primary Examiner* — Paul T Chin
(74) *Attorney, Agent, or Firm* — John A. Powell

(57) ABSTRACT

A mobile conductor lift comprised of multiple lightweight subassemblies that may be rapidly assembled manually or using handheld tools by a small crew of workers and that is capable of being quickly and easily placed into multiple potential configurations and in either horizontal or vertical orientations for lifting energized or deenergized conductors away from power poles in order to provide room for work to be performed by workers on such power poles or on other equipment connected to such power poles.

27 Claims, 16 Drawing Sheets

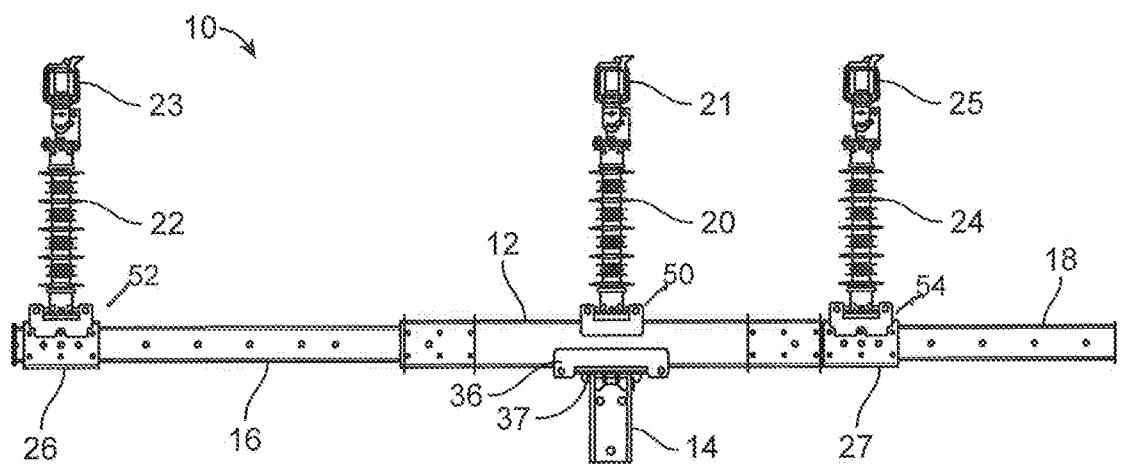
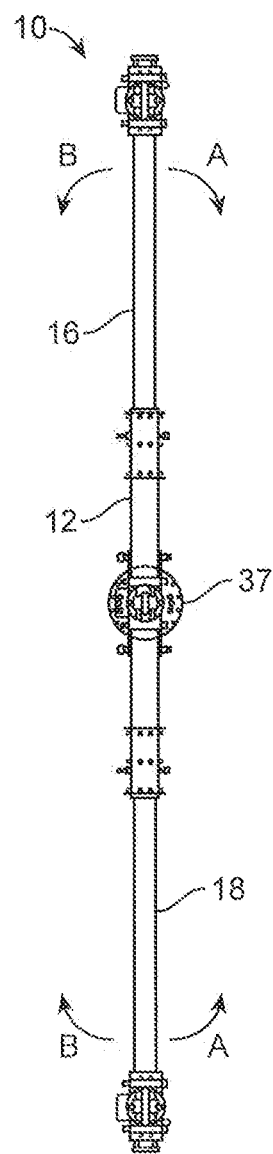
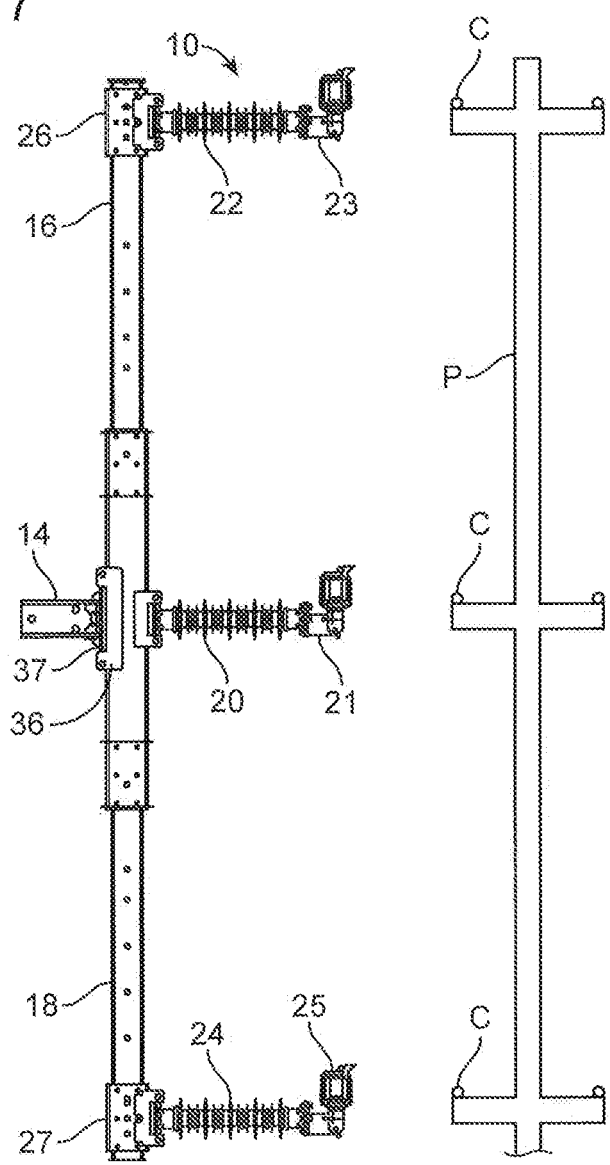
FIG. 7
FIG. 8
FIG. 9

MOBILE CONDUCTOR LIFT

PRIORITY CLAIM

This application claims priority to U.S. Provisional Application No. 62/836,631 filed on Apr. 20, 2019, which is hereby incorporated by reference.

TECHNICAL FIELD OF THE INVENTION

The present invention is generally directed to devices which attach to mobile cranes, lift trucks, bucket trucks, digger derrick trucks, and the like, to facilitate temporary support of electrical power transmission lines.

BACKGROUND ART OF THE INVENTION

Transmission and distribution of electrical power typically relies on sets of high-voltage conductors. In one common arrangement, a set of three conductors, each transmitting one phase of a three-phase alternating-current system, are strung in parallel, spaced apart from each other. The conductors often extend long distances and are supported by periodically-spaced power poles or towers (referred to herein as "supports" or "power poles"). The supports keep the conductors above the ground and ensure that the conductors remain spaced adequately apart from each other.

Each support comprises one or more insulators for each conductor. Each insulator, often in the form of an insulator stem extending upward from, or depending downward from, a cross-member of the support, are intended to prevent the transmission of electrical current from one conductor to another conductor or to the ground below. In addition to carrying three or more conductors, the supports are also sometimes used to carry telecommunications lines such as fiber optic cables, phone lines, or other such lines. The supports also sometimes carry a separate static line near the top that are present to sacrificially protect the conductors from electrical strikes/lightning strikes.

It is often necessary to perform maintenance on or to replace supports, cross-members of supports, insulators, or other equipment located on the supports. However, the hazards inherent in working around high-voltage transmission lines limit the work that can be done on supports and their components while energized conductors are in place and attached to the insulator(s) provided by the supports. Further, since the conductors associated with each support may be providing power to hundreds of thousands of customers, de-energizing the conductors would be a huge disruption to power customers and is therefore impractical. Therefore, it is useful to provide a mobile conductor lift, capable of supporting an energized or non-energized, multi-phase conductor set, and holding the conductors away from the support being accessed. It is also useful to provide such a mobile conductor lift that can be adapted to hold other lines, such as static lines and/or telecommunications lines out of the way while work is being accomplished.

Other mobile conductor lift devices have been proposed, such as conductor lifts which attach to the boom of a boom truck, crane, or similar equipment ("vehicle"). Those devices are generally large, heavy, unwieldy, and difficult to store and frequently require significant assembly involving a crane or forklift in order to place them in a work-ready configuration. Such devices are either incapable of being assembled and disassembled rapidly by a small crew of workers, or require significant effort to assemble or disassemble by small crews of workers. Furthermore, those devices often lack the capability of moving the conductors either vertically or horizontally away from the supports once the conductors are being held by the device such that there is incomplete or imperfect access to the supports, support cross-members, or the insulators of the supports where work is to be performed. Such lift devices also lack the ability to turn the device at an angle after the conductors are attached to the device in order to provide enhanced access to the supports, cross-members, or insulators or other equipment located on the supports.

What is needed is a lightweight mobile conductor lift that can be easily assembled and disassembled by a few workers with only simple, hand-held tools. Another need is a conductor lift capable of moving the conductors being held by the lift device in a manner that results in increased access to the permanent support being worked on, its cross-members, and the insulators and other equipment located on the support. Enhanced ability to stow and transport such a lift device when it is not in use would also be desirable.

SUMMARY OF THE INVENTION

Problems and limitations in the prior art are overcome by providing a lightweight mobile conductor lift principally comprised of only a few main body parts that can be readily assembled into a work-ready configuration or disassembled for storage and/or transport by a crew of one or two workers using only manual work and/or handheld tools. In a first embodiment of the lightweight mobile conductor lift hereby disclosed, the lift is comprised of only seven total subassemblies that may be quickly and easily assembled into a work-ready configuration when work is to be performed involving conductors, or quickly and easily disassembled into the separate subassemblies for storage and transport after such work is completed. The main load-bearing members of the mobile conductor lift is comprised of a central cross arm and two identical extension arms. Each of the extension arms features an arm slider that is part of the extension arm subassembly and is slidably engaged along the length of the extension arm. The lift also features at least three identical insulator stem subassemblies. Lastly, the lift features a mast subassembly that is used to interconnect the bottom of the central cross arm with the end of a crane's boom or the end of the boom of a digger derrick truck.

In order to conduct work using the mobile conductor lift, the subassemblies of the lift may be readily assembled into a work-ready configuration using removable connectors, such as pins, screws, or bolts. During assembly of the lift, the two extension arms are slidably engaged with the two ends of the central cross arm and then detachably connected to the central cross arm. One of the insulator stem subassemblies is detachably connected to the top of the central cross arm. Each of the other insulator stem subassemblies is detachably connected to the top of an arm slider of one of the extension arms, with each arm slider also being capable of being detachably connected in place at a desired position along the extension arm by means of one or more removable connectors. The central cross arm is detachably connected at its base to a mast subassembly that is, in turn, removably attached to the end of the boom of a digger derrick truck or the end of a crane boom.

In order to assist in a more thorough understanding of the invention and its assembly in the latter part of this disclosure, the mobile conductor lift will frequently be described herein as having a "first side" and a "second side", though as set forth above, in reality the two extension arms are identical to each other in structure, and the three insulator stem subassemblies are identical to each other in structure. Thus, during assembly of the mobile conductor lift from separate subassemblies into the assembled, work-ready configuration, a first extension arm and a second extension arm (sometimes collectively referred to jointly as the "extension arms"), are slidably and removably connected to the central cross arm with each of the extension arms being slidably engaged with one end of the central cross arm and then capable of detachable connection to the central cross arm at a set position in relation thereto using removable connectors inserted through pre-drilled holes within the cross arm and extension arm. When assembled into a work-ready configuration, the mobile conductor lift is further comprised of: a central insulator stem subassembly that is removably connected to the top of the central cross arm; a first side insulator stem subassembly that is removably connected to a first arm slider slidably engaged along the length of the first extension arm; and a second side insulator stem subassembly that is removably connected to a second arm slider slidably engaged along the second extension arm. As stated above, the mast subassembly is removably connected to the bottom of the central cross arm and also to the end of a boom.

It may be helpful to further explain the insulator stem subassemblies. In a preferred version of the mobile conductor lift, each insulator stem subassembly is comprised of an insulator stem that is permanently affixed on one end to a conductor holder and permanently affixed on its other end to a mounting base. Each mounting base is capable of being removably attached to the top of one of the main load-bearing members using removable connectors inserted through pre-drilled holes. The insulator stems of the insulator stem subassemblies are all insulators with the same or similar construction, and they typically will weigh approximately 75 lbs and be made of polymeric or composite material, but the weights and material composition of the insulator stems may vary from one embodiment of the conductor lift to another.

As can be understood from the foregoing, the assembly of the mobile conductor lift into its work-ready configuration in the field only requires detachable connection of seven light-weight subassemblies: the three main load-bearing members (which are the central cross arm and the two extension arms), the mast subassembly, and the three insulator stem subassemblies. This results in an ability of one or two workers to rapidly assemble the mobile conductor lift into a work-ready configuration for lifting conductors away from a support and to rapidly disassemble the conductor lift for storage and transport of its individual subassemblies when work involving a support and its conductors is completed Such assembly of the first embodiment of the conductor lift may be accomplished in the field without tools and without a crane or forklift, which is a major advantage.

A second embodiment of the mobile conductor lift hereby disclosed is further comprised of two lead screw mechanisms internal to the extension arms, including: a first lead screw with a first end and a second end that is housed within the first extension arm and is rotatably mounted at its first end to a first body interface and that is rotatably mounted at its second end within a first gear box that is affixed to the distal end of the first extension arm; and a second lead screw with a first end and a second end that is housed within the second extension arm and is rotatably mounted at its first end to a second body interface and that is rotatably mounted at its second end within a second gear box that is affixed to the distal end of the second extension arm. The threaded shaft of each of the lead screws is screwably engaged through an insulator carriage that is, in turn, connected to an arm slider, such that applying torque to the lead screw at the location of the gear box can cause the insulator carriage and the connected arm slider and connected insulator stem subassembly to travel along the length of the threaded portion of the lead screw. In other words, the first lead screw is screwably engaged through a first insulator carriage, the first insulator carriage being disposed within the first extension arm and being connected to the first arm slider, while the second lead screw is screwably engaged through a second insulator carriage, the second insulator carriage being disposed within the second extension arm and being connected to the second arm slider. It should be noted that the lead screws, body interfaces, and insulator carriages contained within the bodies of the two extension arms are actually identical, and as set forth above, in reality the extension arms themselves are also identical to each other, the terms "first" and "second" being used with regard to the extension arms only for purposes of illustrating the fact that one extension arm is positioned on a first side of the central cross arm, and the second extension arm is positioned on the opposite side of the central cress arm when the conductor lift is assembled in its work-ready configuration.

There are a number of additional potential variations on the embodiments of the invention discussed above, including at least the following possible alternatives:

1) by including an articulation plate that pivotably attaches to the base of the mast and can be detachably connected to a crane boom or to the end of the boom of a digger derrick truck, the lift can be made articulable such that during work on a support and its conductors, the entire mobile conductor lift may be pivoted in relation to the end of the boom and thereby one end of the lift may be pivoted away from the support while the other end of the lift is pivoted toward the support. For instance, and by way of example only, the articulation plate could be used to pivot the first extension arm and attached first side insulator stem subassembly toward a support while the second extension arm and second side insulator stem subassembly are being pivoted away from the support. Once a desired orientation of the lift is achieved in relation to the boom and the support being worked on, removable connectors can be used to temporarily affix the articulation plate in a desired position so as to temporarily prevent further pivoting action of the lift while work is being performed;

2) by including a turntable as part of the body of the mast subassembly, the main body of the conductor lift may be rotated at an angle in relation to an attached boom and in relation to a support when work is being done involving the support and its conductors. For instance, and by way of example only, rotation of the lift by means of the turntable incorporated within the mast subassembly would allow the base of the mast subassembly to remain stationary in relation to the end of a boom to which it is connected, while the conductor lift could be rotated at an angle in relation to either a vertically oriented support or a horizontally oriented cross-member of a support. Once the desired rotated angle of the main body of the conductor lift is achieved, the top half and bottom half of the turntable can be temporarily affixed to each other so as to temporarily prevent any further angular rotation of the conductor lift by means of the turntable;

3) the insulator stems of the device may be made of a polymer or plastic material rather than glass or ceramic in order to reduce total weight;
4) each of the lead screws of the second embodiment may be additionally rotatably mounted within its respective extension arm by a bottom shaft support that is positioned intermediate of the corresponding body interface and gear box and that is affixed to the bottom wall of the extension arm, with the lead screw being rotatably mounted through a through-hole of the bottom shaft support;
5) Each of the lead screws of the second embodiment may also be optionally rotatably mounted within its corresponding extension arm by a top shaft support that is positioned intermediate of the corresponding body interface and gear box and that is affixed to the top wall of the extension arm, with the lead screw being rotatably mounted through a through-hole of the top shaft support;
6) a plurality of positioning holes defined along the elongate body of each of the extension arms and at least one positioning hole provided within each of the arm sliders such that the position of the first arm slider along the first extension arm can be selected by removable connection of the first arm slider with one or more of the plurality of positioning holes, and such that the position of the second arm slider along the second extension arm can be selected by removable connection of the second arm slider with one or more of the plurality of positioning holes, such removable connections being accomplished with removable connectors such as pins, screws, or bolts;
7) each of the gear boxes attached to the end of the extension arms of the second embodiment may have multiple torque application points where an impact driver, wrench, ratchet or battery powered drill may be used to apply torque to the corresponding lead screw in order to actuate the respective removably attached insulator carriage and arm slider and cause them to travel lengthwise along a portion of the respective extension arm.

BRIEF DESCRIPTION OF THE DRAWINGS

The disclosed invention will be described with reference to the accompanying drawings, which show important sample embodiments, wherein:

FIG. 7 is a front view of the first embodiment of the conductor lift in which one of the arm sliders and an attached insulator stem assembly attached thereto have been moved from the distal end of an extension arm to a position in which the arm slider abuts an end of the central cross arm.

FIG. 8 is a top view of the first embodiment of the conductor lift with arrows intended to demonstrate how the conductor lift may be rotated at an angle by means of a turntable in the mast subassembly.

FIG. 9 is a front view of the first embodiment of the conductor lift and a power pole with conductors intended to illustrate a situation where the conductor lift has been placed into a vertical alignment in relation to the power pole prior to moving the conductors sideways away from the power pole.

DETAILED DESCRIPTION OF THE PREFERRED EMBODIMENTS

Figure 1:
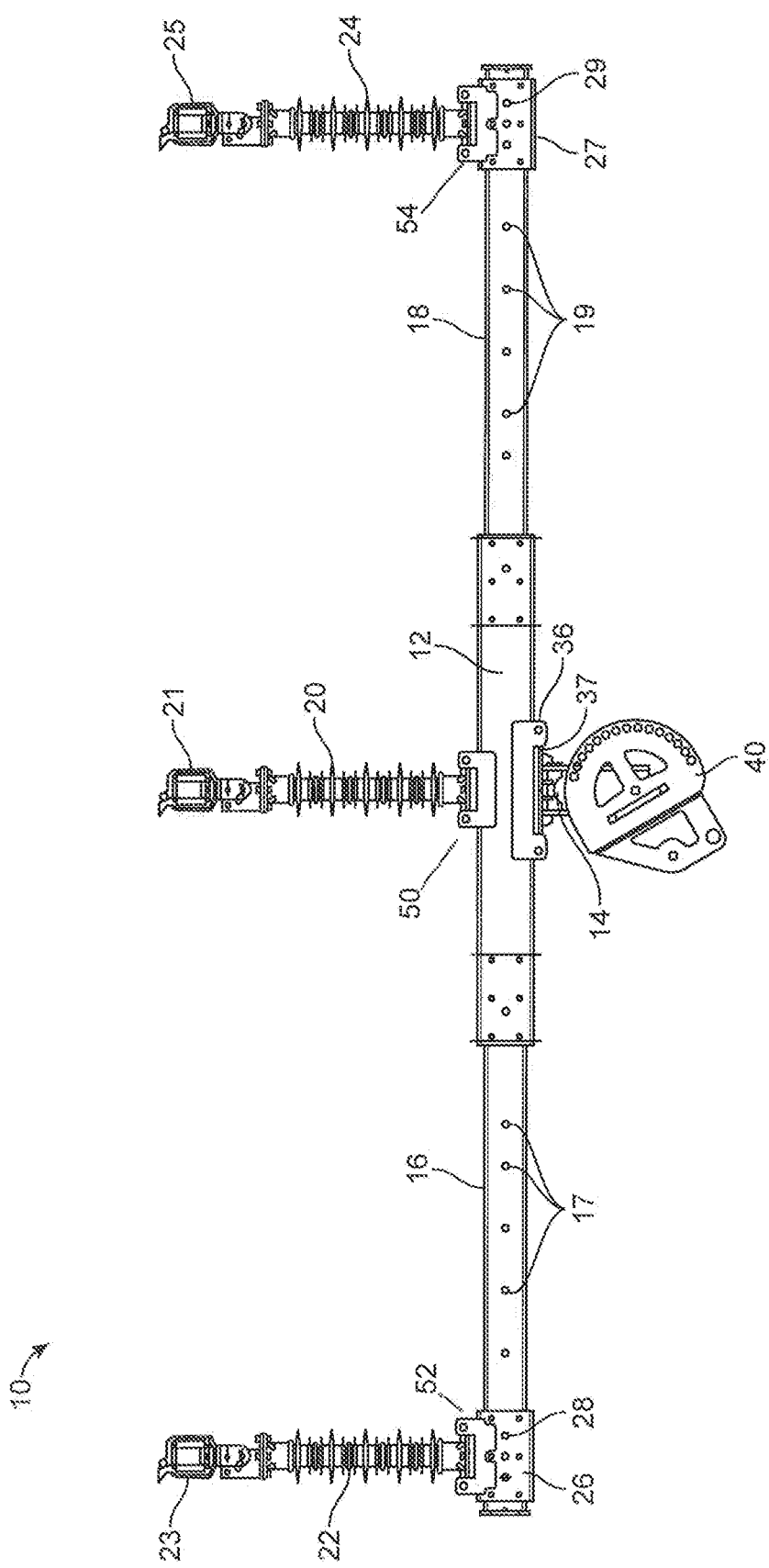
FIG. 1 is a front view of a first embodiment of the conductor lift.

FIGS. 1-9 illustrate a first embodiment of a mobile conductor lift 10 incorporating aspects of the present invention. The first embodiment of conductor lift 10 illustrated in FIGS. 1-9 is generally configured to be used with three-phase 25 kV to 72.5 kV power distribution systems. The three-phase 25 kV to 72.5 kV embodiment is used throughout this description to illustrate the inventions. However, persons of ordinary skill in the art will appreciate that conductor lift 10 can be modified and sized for use with other power distribution systems, including, without limitation, systems with higher or lower voltages, two-phase systems, DC systems, systems including static lines, systems including telecommunication lines run on supports with conductors, and systems using multiple conductors per phase. Additionally, although many disclosed features are especially well-suited for manipulation of energized conductors without disruption to power delivery to customers, conductor lift 10 can obviously be used in on-energized situations.

As shown in FIGS. 1-9, the first embodiment of the mobile conductor lift 10 is configured to be mountable on the boom of a crane, a lift truck, a digger derrick truck, or similar transport device (not illustrated). Conductor lift 10 is detachably connected to the boom of such crane or transport device by at least a detachably connected mast 14, but in preferred embodiments, the conductor lift 10 will be removably interconnected to the boom by means of a mast subassembly comprised of a mast 14 connected to an articulation plate 40 and including a cross arm bracket 36, and a turntable 37. In such preferred embodiments, the articulation plate 40 connects the mast 14 to a boom and provides the ability to articulate the conductor lift 10 both toward and away from the boom on which it may be mounted, while the turntable 37 allows the conductor lift 10 to be rotated at an angle relative to the boom on which it may be mounted. As stated previously, once a desired pivoted orientation and a desired angular rotation are achieved, removable connectors may be used to temporarily affix the articulation plate and the turntable in a set position so that no more pivoting or angular rotation occurs until such removable connectors are removed and such movement is again made possible.

The conductor lift 10 features a central cross arm 12 that may be connected at its bottom directly to the mast 14 that is in turn mounted to a boom, or in a preferred embodiment, the central cross arm 12 may be connected by means of a cross arm bracket 36 to a mast subassembly comprised of the mast 14, a turntable 37, and an articulation plate 40. As discussed above, in preferred embodiments, the mast 14 is connect to the boom of a crane or transport device (not shown) by means of an articulation plate 40 that allows the conductor lift 10 to be articulated toward or away from the lengthwise body of the boom. The conductor lift 10 further includes a central insulator stem subassembly comprised of an insulator stem 20 with a first end and a second end, the first end being rigidly affixed to a mounting base 50 and the second end being rigidly affixed to a conductor holder. The central insulator stem subassembly is removably connected to the top of the central cross arm 12 by means of the mounting base 50 and one or more removable connectors such as removable pins.

The first embodiment of the conductor lift 10 further features a first extension arm 16 and second extension arm 18 that are each slidably engaged with opposite ends of the central cross arm 12, with the extension arms 16, 18 extending outwardly in opposite directions from the ends of the central cross arm 12. The extension arms 16, 18 may be slid further toward the center of, or away from the ends of, the central cross arm 12 and may be removably pinned, bolted, or screwed into position in relation to the central cross arm 12, as shown in FIG. 1 when the conductor lift 10 is assembled. When the conductor lift 10 is disassembled for storage or transport, the extension arms 16, 18, may be unpinned, unbolted, or unscrewed from the central cross are 12, and then slidably disengaged and disconnected from the central cross arm 12.

The conductor lift 10 further includes a first arm slider 26 that is slidably engaged with the first extension arm 16 and a second arm slider 27 that is slidably engaged with the second extension arm 18 such that the arm sliders 26, 27 may be slid back and forth as desired along the length of the respective extension arms 16, 18 between positions where the sliders 26, 27 would be in closer proximity to, or even potentially in abutting contact with, the ends of the central cross arm 12, to positions where the sliders 26, 27 would be located closer to, or at, the distal ends of the respective extension arms 16, 18, as illustrated in FIG. 1. When the arm sliders 26, 27 are in a desired position along the respective extension 16, 18, the arm sliders 26, 27 may be detachably connected to the respective extension arms 16, 18 by means of removable pins, bolts, or screws that may be removably inserted into one or more pre-drilled slider pin holes 28, 29 and into one or more of the corresponding multiplicity of pre-drilled arm pin holes 17, 19 that are located along a portion of the length of the respective extension arms 16, 18. This is done in order to temporarily hold the arm sliders 26, 27 in a desired position for operational use of the conductor lift 10 to hold and/or manipulate live or deenergized conductors. As can be appreciated, when the conductor lift 10 is disassembled, the pins, bolts, or screws that were used to temporarily hold the arm sliders 26, 27 in place in a certain position may be removed and the arm sliders 26, 27 may be slid freely along their respective extension arms 16, 18.

The conductor lift 10 further features a first side insulator stem subassembly comprised of an insulator stem 22 with a first end and a second end, the first end of which is interconnected to the first arm slider 26 by means of a mounting base 52, and the second end of the insulator stem 22 being connected to a conductor holder 23. The conductor lift also includes a second side insulator stem subassembly comprised of an insulator stem 24 with a first end and a second end, the first end of which is interconnected to the second arm slider 27 by means of a mounting base 54, and the second end of the insulator stem 24 being connected to a conductor holder 25. As can be appreciated from reviewing FIGS. 1, 2, and 5, and especially FIG. 7, when the arm sliders 26, 27 are unpinned, unbolted, or unscrewed from their respective extension arms 16, 18, they may be moved by sliding action along the length of a portion of the respective extension arms 16, 18, and by doing so, the respective mounting bases 52, 54, respective insulator stems 22, 24, and respective conductor holders 23, 25, may be moved laterally toward or away from the central cross arm 12 to a position where they may be useful holding or manipulating live or deenergized conductors. When the respective insulator stems 22, 24 and their respective conductor holders 23, 25 are in a desired position, the arm sliders 26, 27 may be removably pinned, bolted, or screwed in place using such removable connectors and one or more of the multiplicity of arm pin holes 17, 19. Slidable movement of the arm sliders 26, 27 along the length of the extension arms 16, 18 as illustrated in FIGS. 1-9 may be accomplished manually. However, such sliding movement along the lengths of the extension arms 16, 18 could also potentially be accomplished using various additional mechanical, hydraulic, or pneumatic mechanisms, and the addition of all such mechanisms would not depart from the ambit of the inventive disclosure provided herein. In fact, one specific mechanical mechanism is shown in FIGS. 10-18 and discussed hereinbelow as a second embodiment of the conductor lift.

Figure 2:
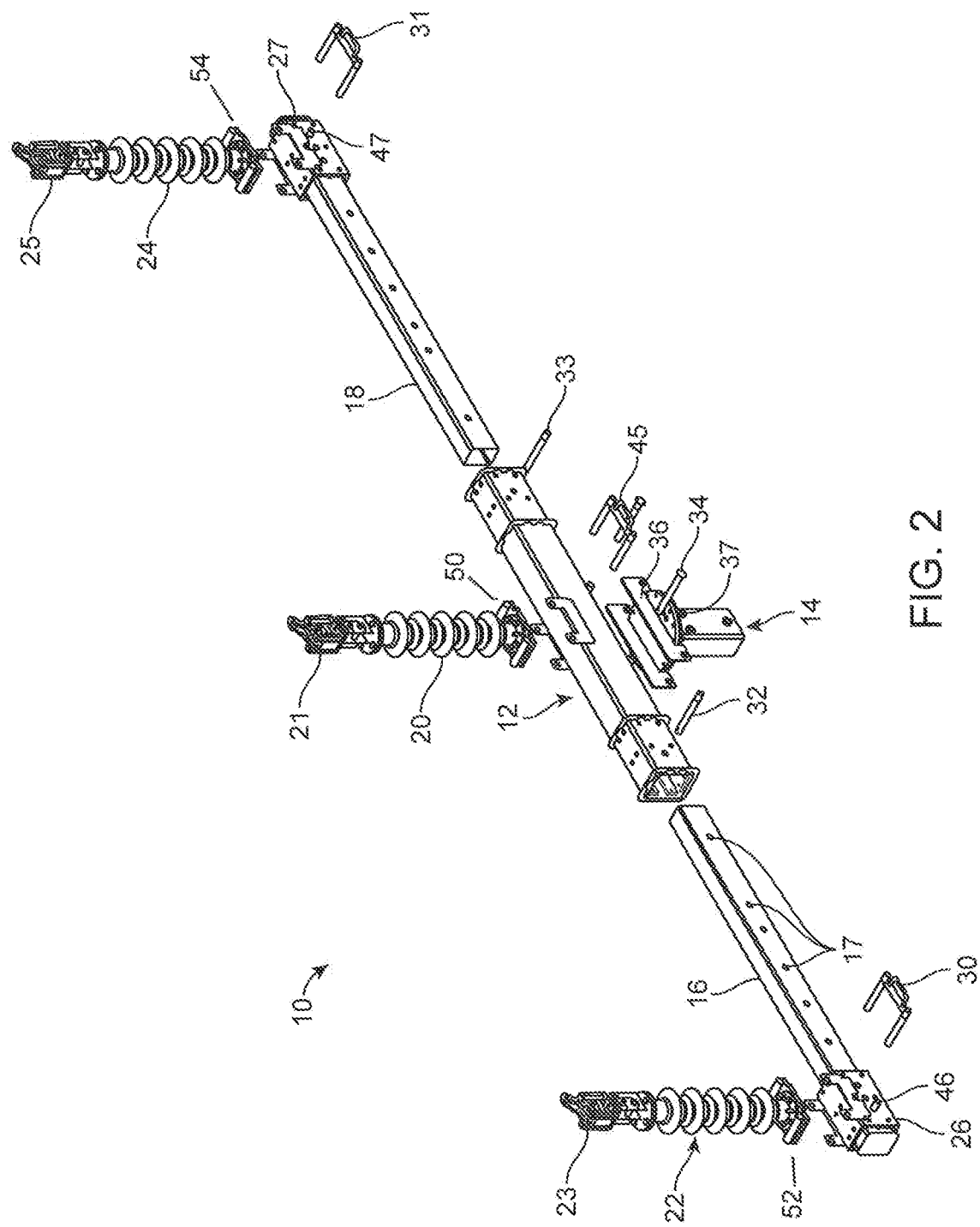
FIG. 2 is an exploded perspective view of the first embodiment of the conductor lift showing many of the components of the conductor lift in an exploded, disassembled state.

FIG. 2 illustrates a few optional features of the first embodiment of the conductor lift 10. As shown in FIG. 2, the arm sliders 26, 27 may be removably attached in place in relation to their respective extension arms 16, 18 by means of removable slider pins 46, 47, while the mounting bases 52, 54 connected to the insulator stems 22, 24 may be removably attached in place to their respective arm sliders 26, 27 by means of respective stem pins 30, 31. Likewise, the central insulator stem subassembly and its insulator stem 20 and attached mounting base 50 may be removably attached in place in relation to the central cross arm 12 by means of a central stem pin 45. As further illustrated, the extension arms 16, 18 may be removably attached in place in relation to the central cross arm 12 by means of removable cross arm pins 32, 33. The central cross arm 12 may also be removably connected to the cross arm bracket 36 by means of one or more bracket pins 34. As can be appreciated removable pins could also be used to temporarily hold the turntable 37 in a certain position (not labelled) in relation to the base of the mast 14. In practice, all such removable pins could be replaced by screws, bolts, or any other reasonable means of sturdy, but removable connection. Practicing the invention as heroin disclosed is not contingent on the manner in which the various subassemblies of the invention are detachably connected when the lift is placed in a work-ready configuration.

Figure 3:
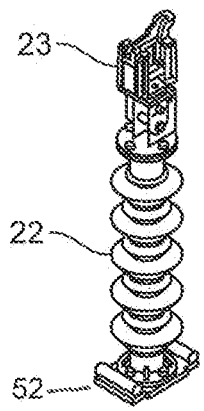
FIG. 3 is a perspective view of an insulator stem subassembly of the conductor lift.

FIGS. 3-6 illustrate various subassemblies of the first embodiment of the conductor lift 10. One of the insulator stem subassemblies, namely the first side insulator stem subassembly, is illustrated in FIG. 3 showing its mounting base 52, insulator stem 22, and conductor holder 23. It should be understood that the central insulator stem subassembly and the second side insulator stem subassembly are identical in structure to the first side insulator stem subassembly shown in FIG. 3. The advantage of using insulator stem subassemblies that are identical is that they are interchangeable and can be readily substituted for one another without any need to keep them separately organized when the conductor lift 10 is disassembled and stored for transport, such as in the storage cube discussed below.

Figure 4:
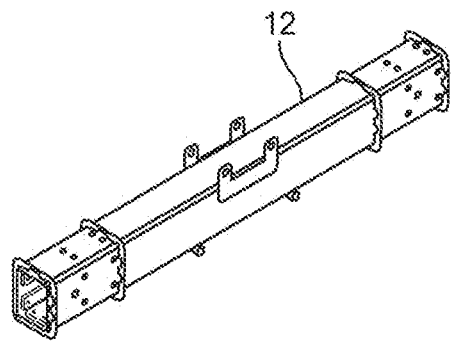
FIG. 4 is a perspective view of a subassembly of the conductor namely, the central cross arm.
Figure 5:
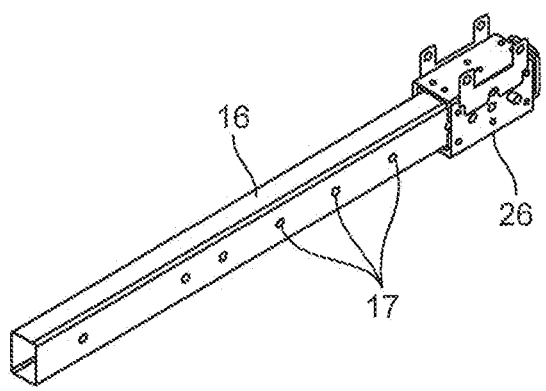
FIG. 5 is a perspective view of a subassembly of the first embodiment of the conductor lift, namely, an extension arm and its arm slider.
Figure 6:
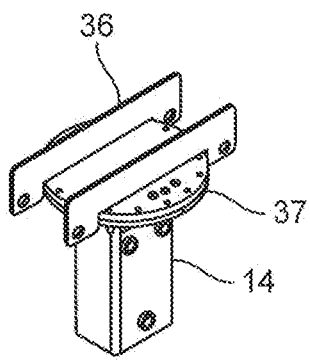
FIG. 6 is a is a perspective view of a subassembly of an embodiment of the conductor lift, namely, the mast including an optional turntable.

FIG. 4 illustrates the central cross arm subassembly of the first embodiment. FIG. 5 illustrates one of the extension arms of the first embodiment, namely the first side extension arm 16 and its respective arm slider 26 that is slidably attached to the first side extension arm 16. FIG. 5 also shows the respective multiplicity of arm pin holes 17 along the length of the first extension arm 16. As explained previously, in reality the extension arms 16, 18 and their respective arm pin holes 17, 19 and respective arm sliders 26, 27 will normally be identical in structure. In other words, extension arm 16 will normally be identical to extension arm 18, and arm slider 26 will normally be identical to arm slider 27, but they have been labeled with different numbers in the drawings solely in order to illustrate and better facilitate an understanding that there are two separate sides of the main body of the conductor lift 10 when it is fully assembled into its work-ready configuration (as shown in FIG. 1), nevertheless it should be appreciated that the components and subassemblies on each side of the conductor lift 10 will normally be mirror images of one another from a structural viewpoint.

FIG. 7 is intended to illustrate that the arm sliders 26, 27 can be slidably moved to different positions along the length of the respective extension arms 16, 18 before they are removably pinned, bolted, or screwed temporarily in place for use in holding and/or manipulating live or deenergized conductors while work is being performed involving a support and its conductors. In FIG. 7, the first arm slider 28 is located at the distal end of the first extension arm 16, while the second arm slider 27 has been moved along the second extension arm 18 to position where it abuts one end of the central cross arm 12.

FIG. 8 is intended to illustrate how the main body of the conductor lift 10 can be rotated at an angle in relation to the base of the roast 14 and any connected boom (not illustrated in FIG. 8) by means of the turntable 37. As can be well understood, the extension arms 16, 18 could be rotated in a first direction ("A") or in a second direction ("B") in relation to the base of the mast 14 and a connected boom. In a preferred embodiment, the conductor lift 10 can be rotated up to 30° in the A direction, and up to 30° in the B direction.

FIG. 9 is a somewhat crude depiction of the conductor lift 10 in a vertical orientation as it might appear immediately prior to use in holding and pulling a number of conductors ("C") sideways away from an overhead power pole ("P"). As can be understood, the conductor lift 10 can be brought into vertical orientation generally aligned with a vertical power pole P by means of the articulation plate 40 (not illustrated in FIG. 9), the insulator stems 22, 24 and their respective conductor holders 23, 25 can be moved into a desired position by sliding and then removably pinning the sliders 26, 27 in desired positions along the extension arms 16, 18, and then the conductor holders 21, 23, 25 can then be cased to hold and/or manipulate one or more of the conductors C so that workers can perform work or maintenance on the conductors C or the power pole P. In this illustration the conductors C would likely be pulled sideways away from the power pole P in order to create room for workers to complete their work on the pole P, its cross-members, its insulators, or other equipment located on the pole.

Turning now to FIGS. 10-18, these figures illustrate a second embodiment of the conductor lift 100. The second embodiment of the conductor lift 100 illustrated in FIGS. 10-18 is also generally configured to be used with three-phase 25 kV to 72.5 kV power distribution systems, but may also potentially be used with higher voltage systems, and may be used with energized ("live") or non-energized conductors. The second embodiment of the conductor lift 100 is very similar to the previously described first embodiment of the conductor lift 10 and includes many of the same features and subassemblies, except that the second embodiment of the conductor lift 100 features distinctly different mechanical means for sliding the arm sliders 26, 27 to desired positions prior to being removably pinned, bolted or screwed in place when the conductor lift 100 is placed into a work-ready configuration. The second embodiment of the conductor lift 100 features screw extension arms 56, 58 that each contain an identical lead screw 70 internal to the screw extension arms 56, 58, and each of the screw extension arms 56, 58 are connected at their distal ends to respective identical gear boxes 60, 62. The second embodiment of the conductor lift 100 is designed such that each of the arm sliders 26, 27, while being slidably engaged with a respective screw extension arm 56, 58, is also now connected to an insulator carriage 90 that is screwably connected through its center to a lead screw 70, with an insulator carriage 90 and lead screw 70 being housed within the body of each of the extension arms 56, 58.

As illustrated in FIGS. 10-18, conductor lift 100 features a first screw extension arm 56 and a second screw extension arm 58, both of which may be detachably connected to a central cross arm 12 by means of removable pins, bolts, or screws when the lift 100 is placed into a work-ready configuration. The conductor lift 100 also includes a central insulator stem subassembly comprised of an insulator stem 20 with a first end and a second end, the first end of the insulator stem 20 being interconnected to the top of the central cross arm 12 by means of a mounting base 50 that is removably connected to the central cross arm 12, and on its other end to a first conductor holder 21. A first arras slider 26 is slidably connected to the first screw extension arm 56, and second arm slider 27 is slidably connected to the second screw extension arm 58. A first side insulator stem subassembly comprised of an insulator stem 22 is connected on one end to a mounting base 52 that is removably connected to the first arm slider 26, and on the second end it is connected to a second conductor holder 23. Likewise, a second side insulator stem subassembly is comprised of an insulator stem 24 that is connected on one end to a mounting base 54 that is removably connected to the second arm slider 27, and on its other end to a third conductor holder 25. The lift 100 will feature at least a mast 14 that can be used to connect the central cross arm 12 to the boom of a crane or transport vehicle, and may optionally include a mast subassembly comprised of a turntable 37, mast 14, and articulation plate 40 (not illustrated) to enable the lift 100 to be rotated at an angle in relation to the boom (boom is not illustrated) or articulated toward or away from the boom as desired when the lift 100 is in use.

The construction and composition of the screw extension arms 56, 58 will normally be identical, and each of the screw extension arms 56, 58 will contain an identical lead screw 70 internal to, and running the length of, their bodies. Each of the screw extension arms 56, 58 and its internal lead screw 70 will be screwably connected at its distal end to a gear box 60, 62 for screwing actuation of the internal lead screws 70 and rotatably connected to and supported by a body interface 80 at its proximal end. The screw extension arms 56, 58 feature identical means for actuating slidable travel of the respective arm sliders 26, 27 back and forth along at least a portion of the length of the screw extension arms 56, 58, namely, identical insulator carriages 90 through which the lead screws 70 are screwably connected, with the insulators carriage 90 and lead screws 70 being housed within the body of each of the respective screw extension arms 56, 58. These internal features are best observed with reference to FIGS. 13, 17, and 18.

Figure 10:
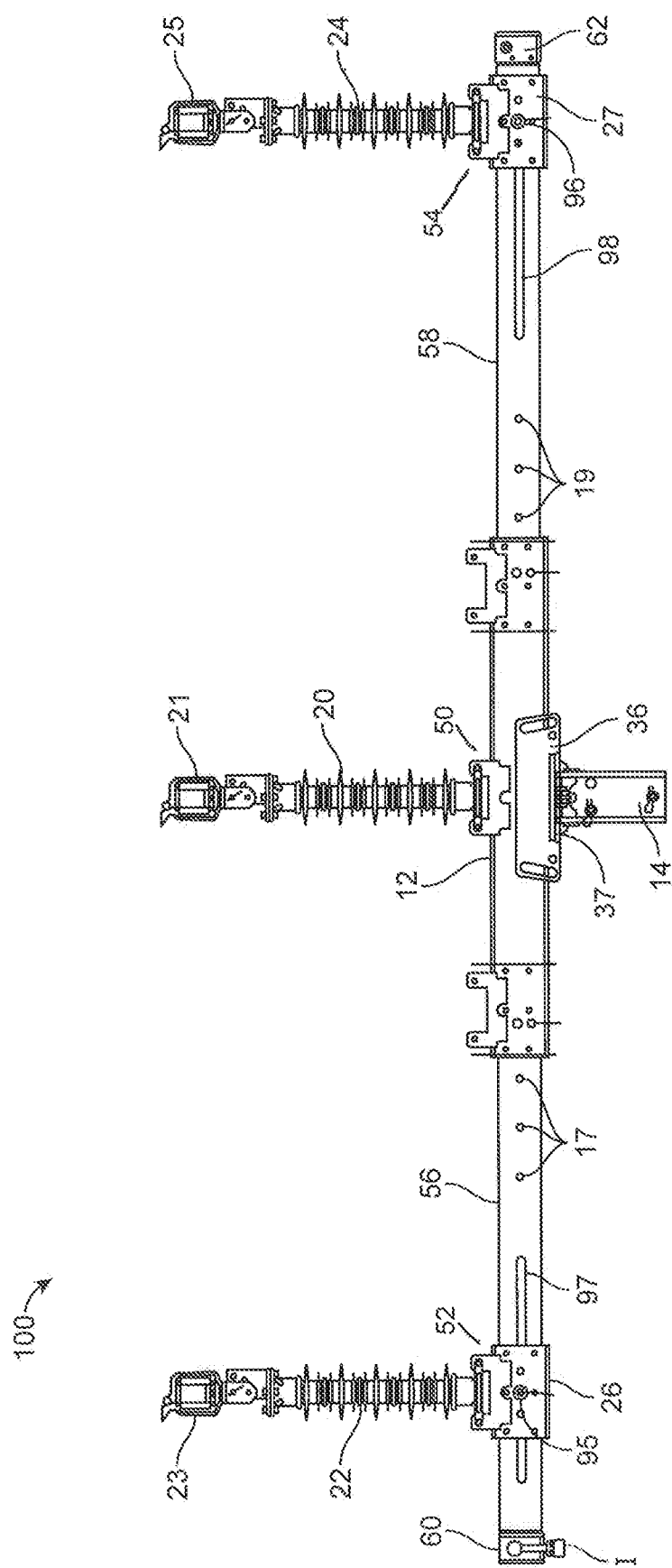
FIG. 10 is a front view of a second embodiment of the conductor lift.
Figure 11:
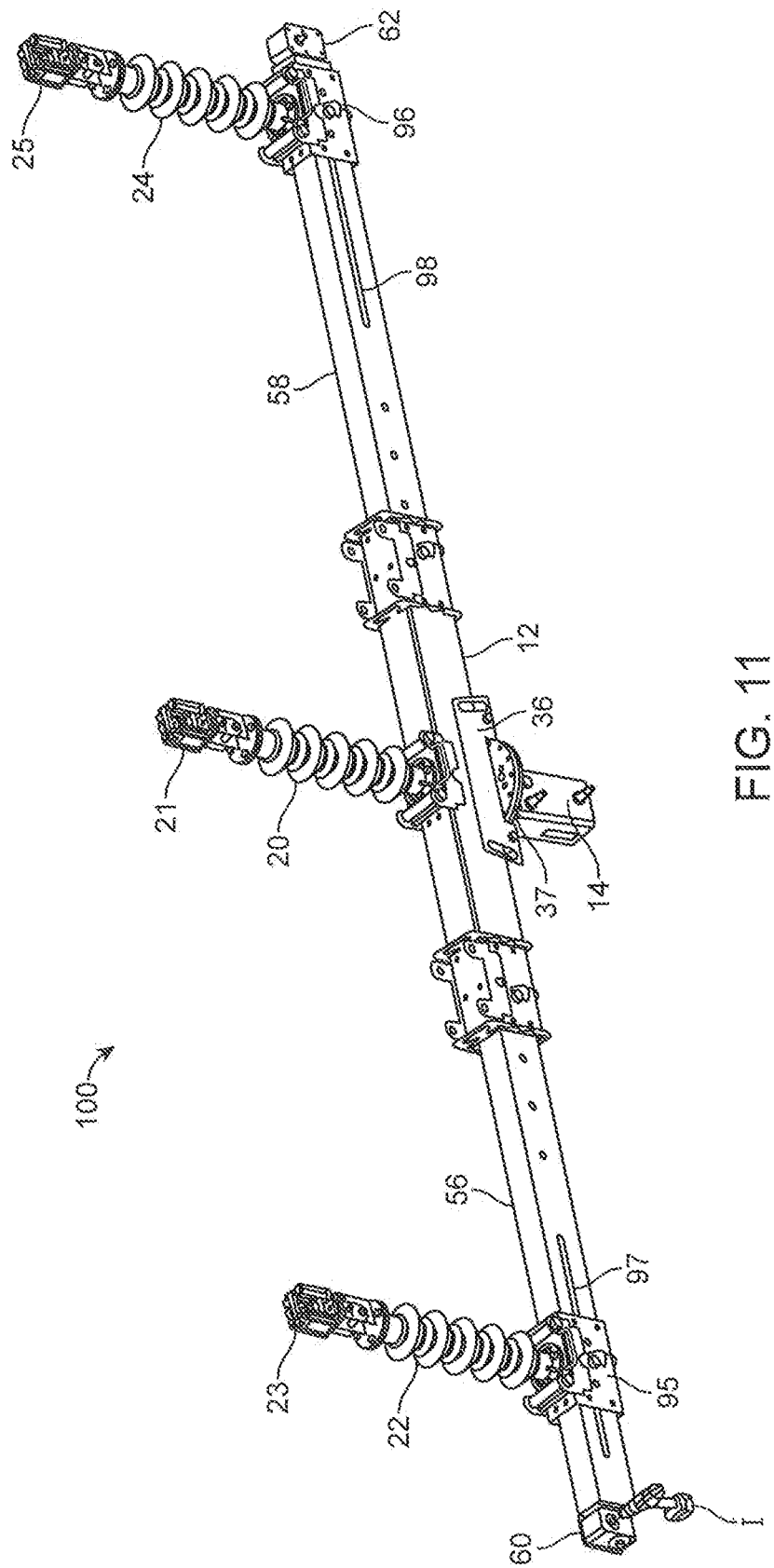
FIG. 11 is perspective view of the second embodiment of the conductor lift.
Figure 12:
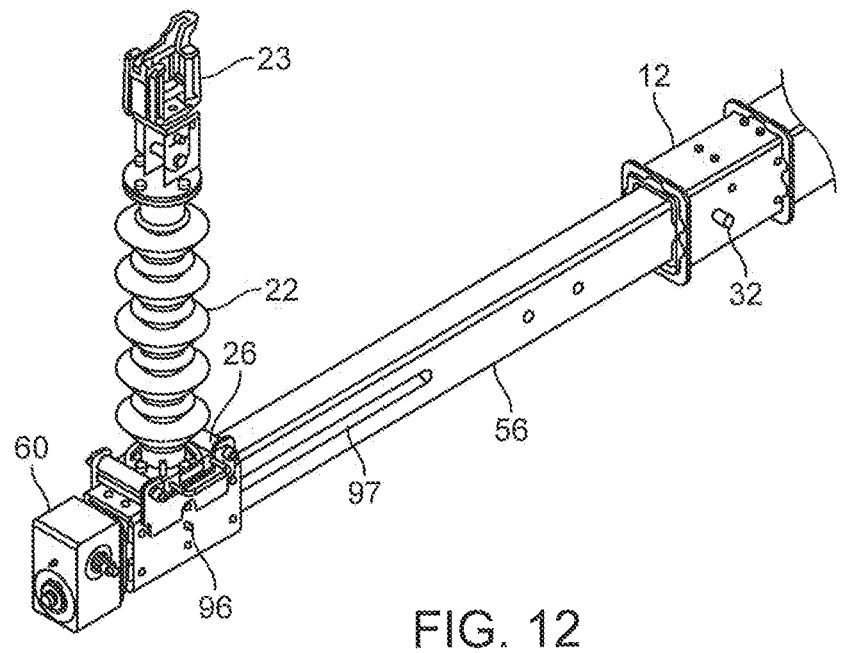
FIG. 12 is a perspective view of a portion of the second embodiment of the conductor lift incorporating a gear box and a screw extension arm containing an internal screw mechanism for movement of the arm slider.
Figure 13:
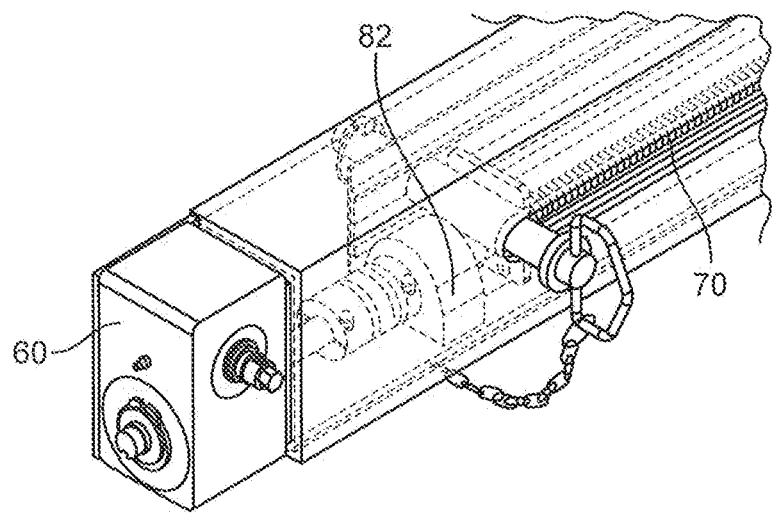
FIG. 13 is a closer view n extension arm and a gear box of the second embodiment of the conductor lift in which the walls of the extension arm are made transparent and the internal structure of the extension arm containing a lead screw is illustrated in dotted lines in order to be observable.

As illustrated in FIGS. 10 and 11, an impact driver ("I") may be used on either of the gear boxes 60, 62 in order to screwably actuate the lead screw 70 inside the respective screw extension arm 56, 58 so that the corresponding insulator carriage 90 will move lengthwise within the respective screw extension arm 56, 58 and thereby cause the respective attached slider 26, 27, and the respective insulator stems 22, 24 and conductor holders 23, 25, to slidably travel along a lengthwise portion of the screen extension arms 56, 58 until the subassemblies are in a desired position for use in manipulating and/or holding conductors. This sliding movement of the side insulator stem subassemblies comprising the mounting bases 52, 54, insulator stems 22, 24, and conductor holders 23, 25 along a lengthwise portion of the respective screw extension arms 56, 58 may be accomplished because the respective sliders 26, 27 are detachably connected by a pin, bolt, or screw to their respective insulator carriage 90 through channel openings 97, 98 that run lengthwise along at least a portion of the sides of the respective screw extension arms 56, 58. In a preferred embodiment, carriage pins 96 are used for the detachable connection between arm sliders 26, 27 and their respective insulator carriages 90.

Figure 14:
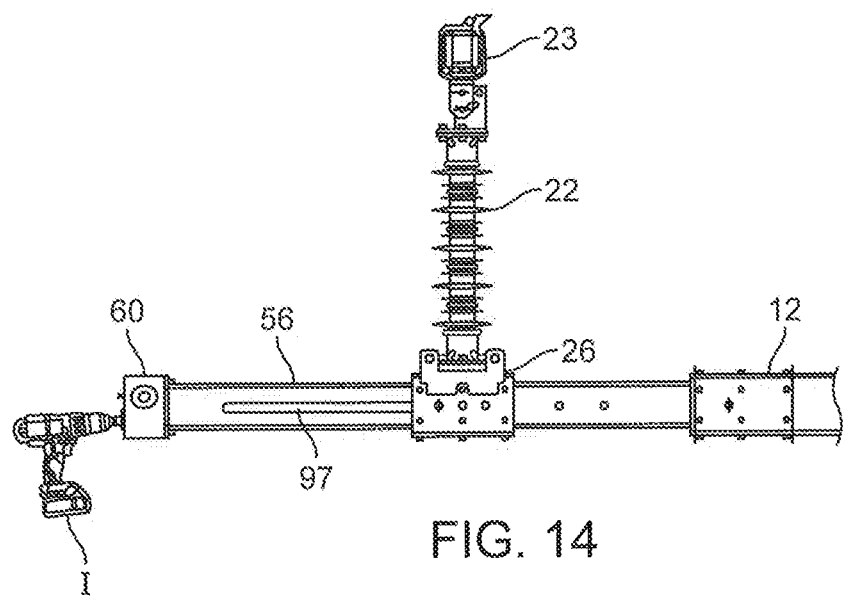
FIG. 14 is a front view of a portion of the second embodiment of the conductor lift with the arm slider and attached insulator stem subassembly located in a first position with respect to the respective extension arm.
Figure 15:
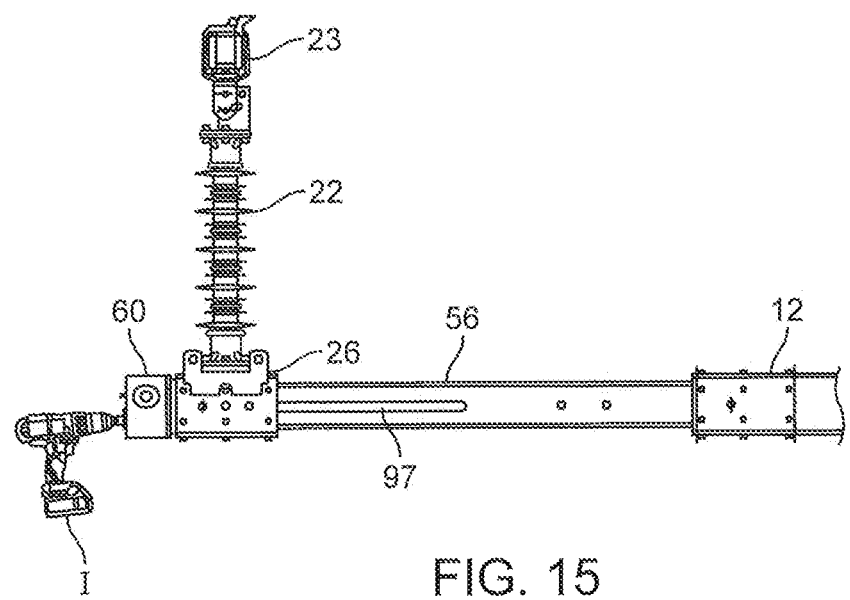
FIG. 15 is the same view as FIG. 14 of the same portion of the second embodiment except that the arm slider and the connected insulator stem subassembly have been moved lengthwise along the respective screw extension arm to a new position at the distal end of the screw extension arm.

The sliding movement of the subassemblies comprising the respective mounting bases 52, 54, insulator stems 22, 24, and conductor holders 23, 25 along a lengthwise portion of the respective screw extension arms 56, 58 is possible when either energized or non-energized conductors are being held in place by the respective conductor holders 21, 23, 25. For example, FIGS. 14 and 15 are intended to illustrate potential sliding movement of the first arm slider 26 along a portion of the length of the first screw extension arm 56. In FIG. 4, the first arm slider 26 is located in an initial position that is closer to the central cross arm 12 than in FIG. 15 where the first arm slider 26 is positioned at the distal end of the first screw extension arm 56. As can be understood, an impact driver I has been used to change the position of the slider 26 from FIG. 14 to FIG. 15 by turning the gear within the gear box 60, which screwably actuates the internal lead screw 70 causing the internal insulator carriage 90 to move toward the distal end of the arm 56, thereby causing the connected slider 26, and the first side insulator stem subassembly comprised of mounting base 52, insulator stem 22, and conductor holder 23, to slide toward the distal end of the first screw extension arm 56. In such a manner the insulator stem 22 and conductor holder 23 may be repositioned at various desirable places along the length of the screw extension arm 56.

Figure 16:
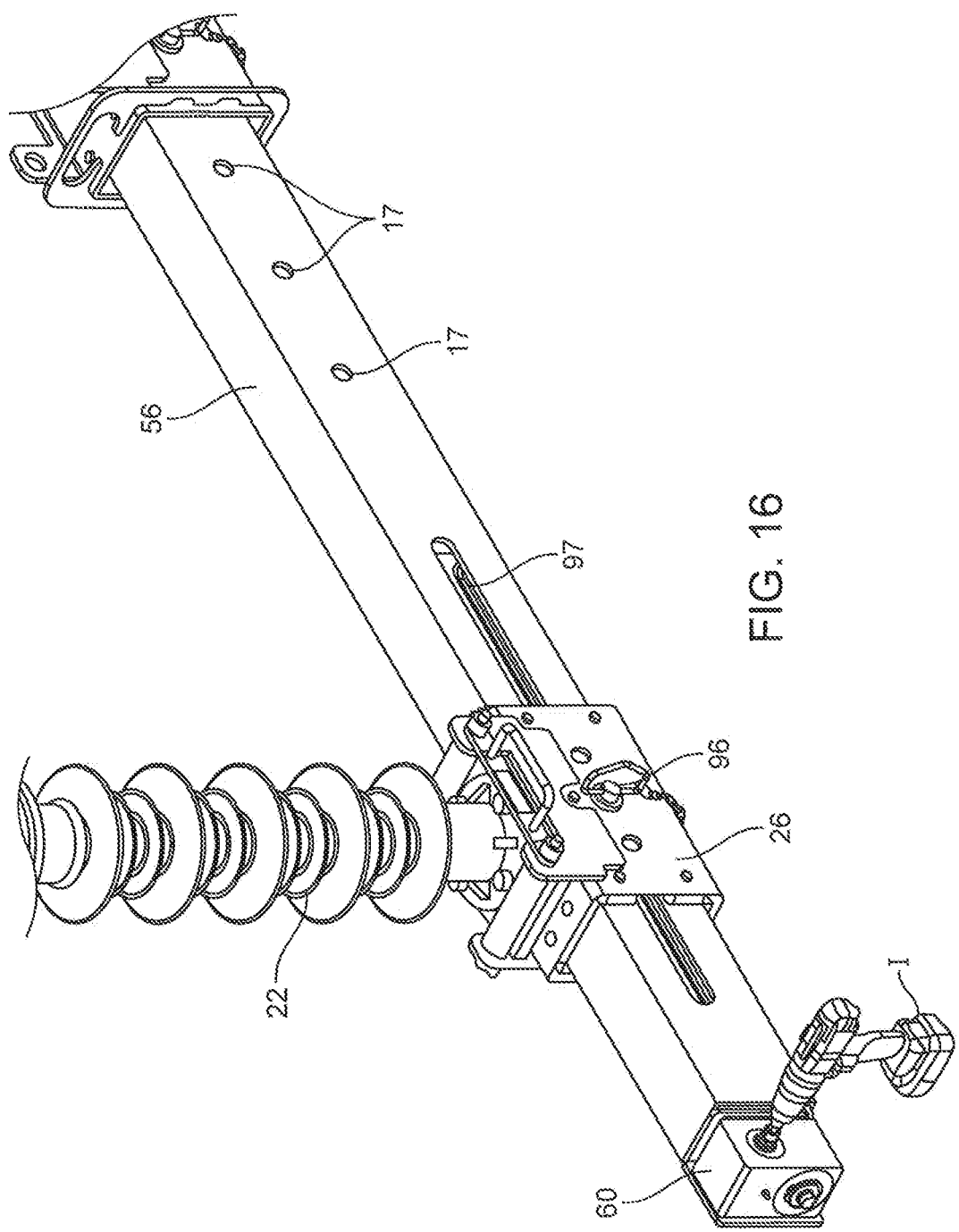
FIG. 16 is a closer view of a portion of the second embodiment conductor lift intended to better illustrate aspects of the second embodiment.
Figure 17:
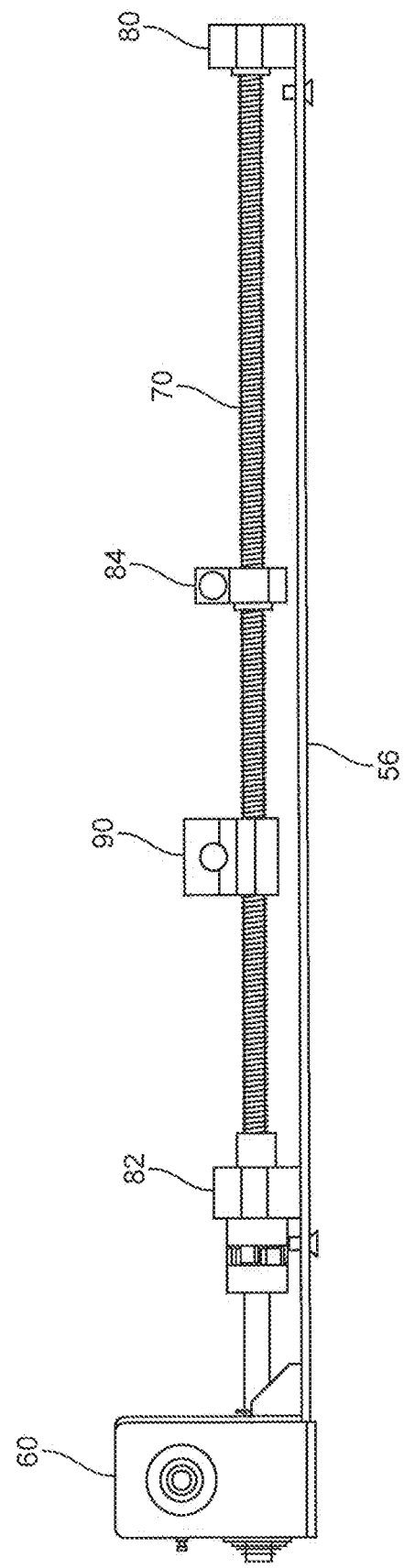
FIG. 17 is a front view of the internal mechanism of a screw extension arm of the second embodiment wherein the side walls and top wall of the screw extension arm have been removed in order to be able to visualize the lead screw, body interface, shaft supports, and insulator carriage that are internal to each of the extension arms.
Figure 18:
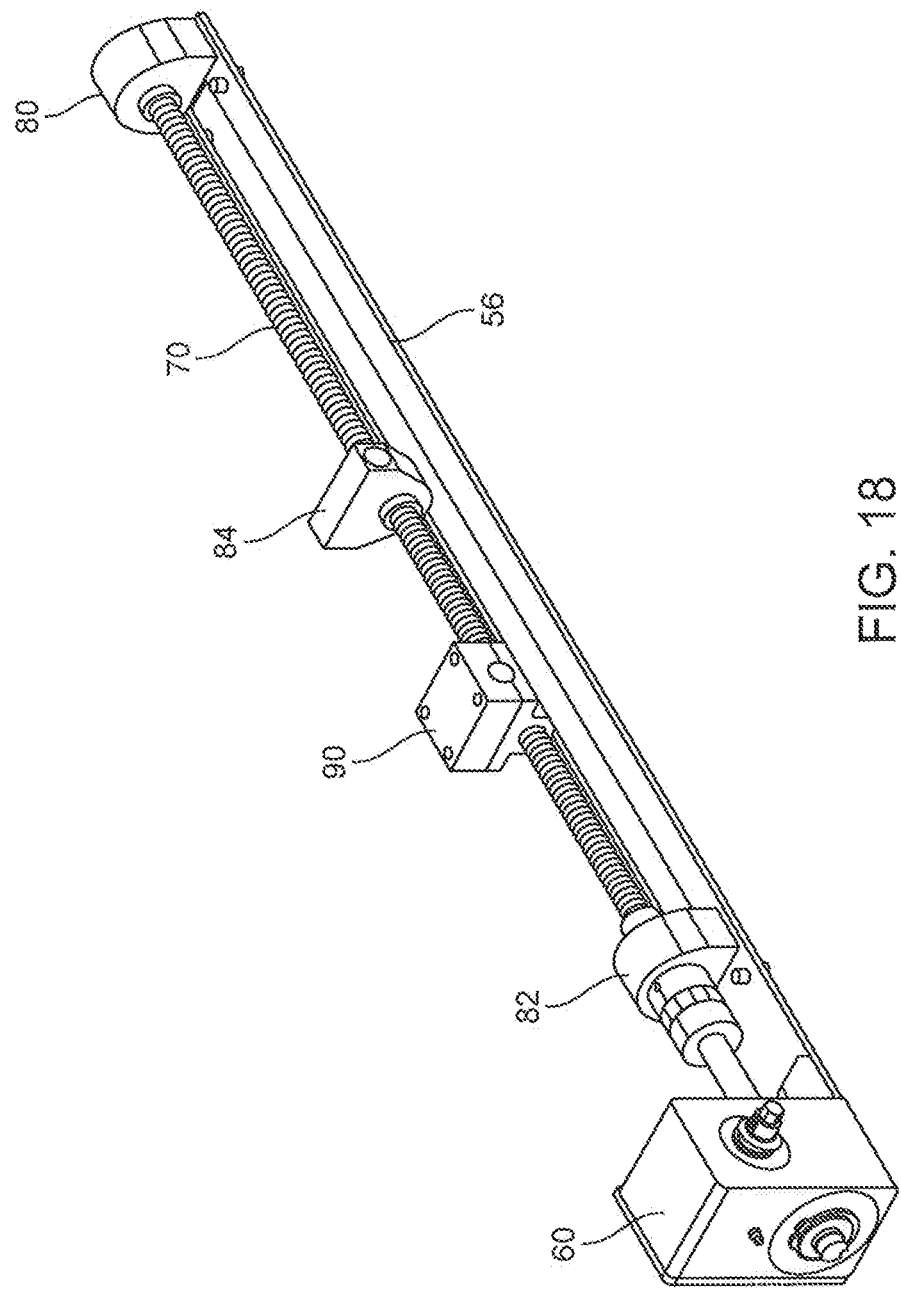
FIG. 18 is a perspective view of the same internal mechanism of a screw extension arm of the second embodiment of the invention as was previously illustrated in FIG. 17.

As shown in FIGS. 16-18, the first screw extension arm 56 contains a lead screw 70 that is connected to a first gear box 60 that is connected to the distal end of the first screw extension arm 56. A first arm slider 26 is slidably engaged with the first screw extension arm 56. The first side insulator stem subassembly is removably connected at the mounting base 52 to the first arm slider 26. Thus, the insulator stem 22 and second conductor holder 23 (not shown in FIG. 16) are caused to travel back and forth in a lengthwise manner along a portion of the first screw extension arm 56, with actuation of the first side insulator subassembly brought about by applying torque to the lead screw 70 through the first gear box 60, such as with an impact driver I, as shown. As illustrated in FIGS. 17 and 18, the lead screw 70 that is internal to the body of the first screw extension arm 56 will turn when torque is applied through the first gear box 60. That torque will turn the lead screw 70 and cause an insulator carriage 90 that is screwably connected to the lead screw 70 to travel toward or away from the first gear box 60, depending upon which direction the torque is applied. The insulator carriage 90 is further connected to the first arm slider 26 such that application of torque to the lead screw 70 at the first gear box 60 will cause the first side-insulator subassembly and its insulator stem 22 and conductor holder 23 to travel along a lengthwise portion of the first screw extension arm 56.

As shown in FIGS. 17 and 18, one end of the lead screw 70 contained within the first screw extension arm 56 is rotatably mounted within a first body interface 80 that is connected to the first screw extension arm 56. The lead screw 70 may also be optionally rotatably mounted within the first screw extension arm 56 by means of a bottom shaft support 82 and a top shaft support 84. In such embodiments, the lead screw 70 will pass through through-holes within the bottom shaft support 82 and top shaft support 84 such that they will provide additional support to the lead screw 70, but will allow it to rotate when torque is applied through the gear box 60 so that the insulator carriage 90 is moved back and forth within the extension arm and the attached first arm slider 26 will slide back and forth with the insulator carriage 90 to which it is removably pinned, bolted, or screwed. As shown in FIG. 16, the gear box 60 may have multiple interfaces for application of torqueing force by an impact driver I.

It should be noted that application of torqueing force using the gear boxes of the screw extension arms does not strictly require use of are impact driver. While an impact driver may be used to apply such torqueing force, a wrench, ratchet, battery powered drill, or other similar handheld tool or device could be used to apply torque at the location of the gear boxes in order to move the side insulator subassemblies back and forth lengthwise along the screw extension arms.

Figure 19:
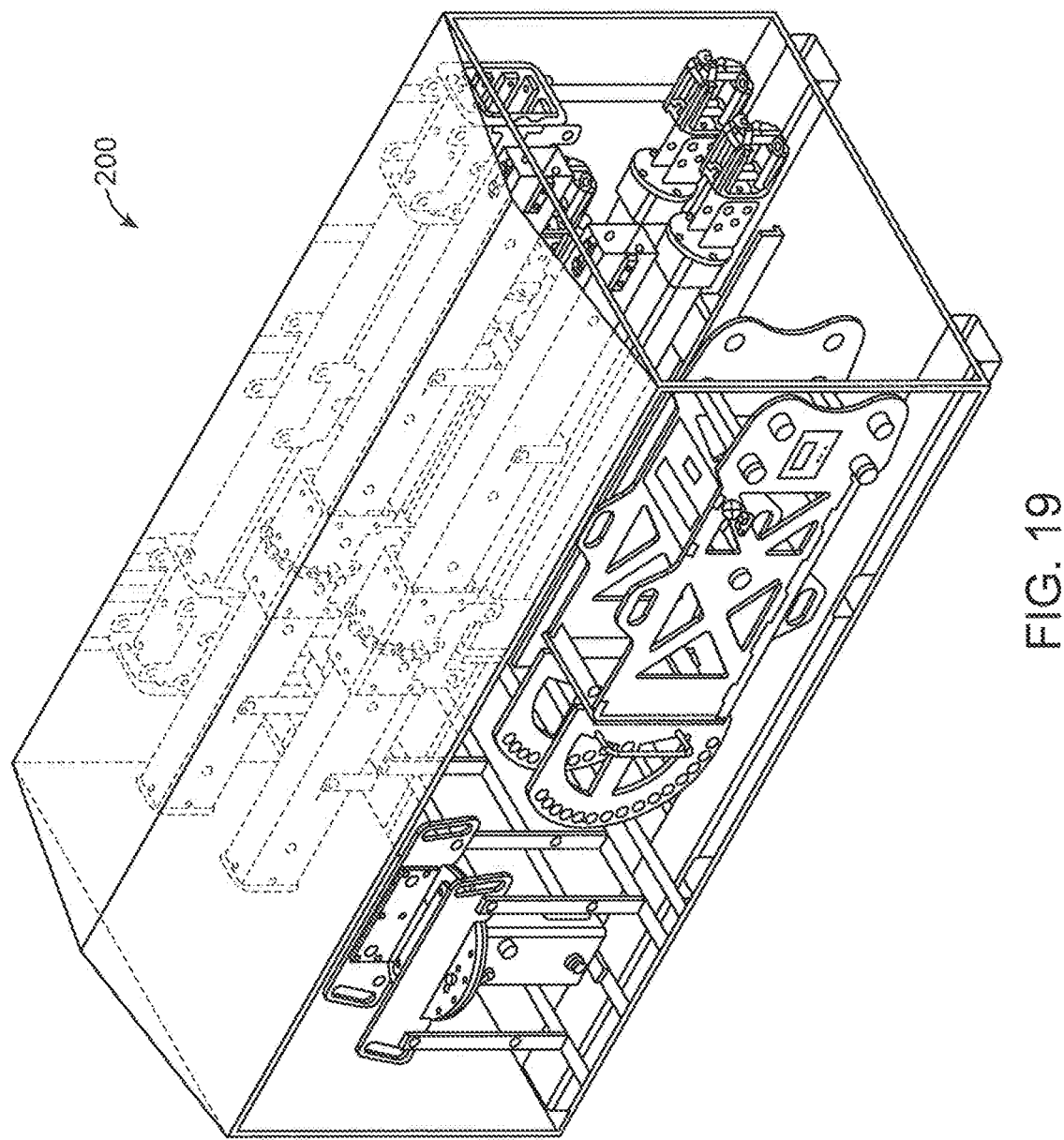
FIG. 19 shows a storage cube that may be used to store and transport the separate subassemblies of the conductor lift when the conductor lift is not assembled and in use.

FIG. 19 is intended to illustrate that either embodiment of the conductor lift 10, 100 may be disassembled and stored within a storage cube 200 that is a storage and organization tool designed to be lifted by a device such as a forklift or other front end loader and placed onto the bed of a standard pickup truck. The storage cube 200 has racks inside it that are specifically designated for storage of the central cross arm, the two extension arms, the three insulator stem subassemblies, and the mast subassembly. The storage cube has dimensions that are four feet by eight feet such that it has a thirty-two square foot footprint and will fit in the bed of a standard pickup truck. The storage cube has skids on its bottom that accommodate the tines or blades of a forklift or front end loader. As shown in FIG. 19, each of the subassemblies of the conductor lift has a separate location where it can be stored inside the storage cube for organization and transport. Use of the storage cube 200 in connection with the conductor lift 10, 100 allows for the various parts to be organized and stored in a sensible and helpful manner.

Figure 20:
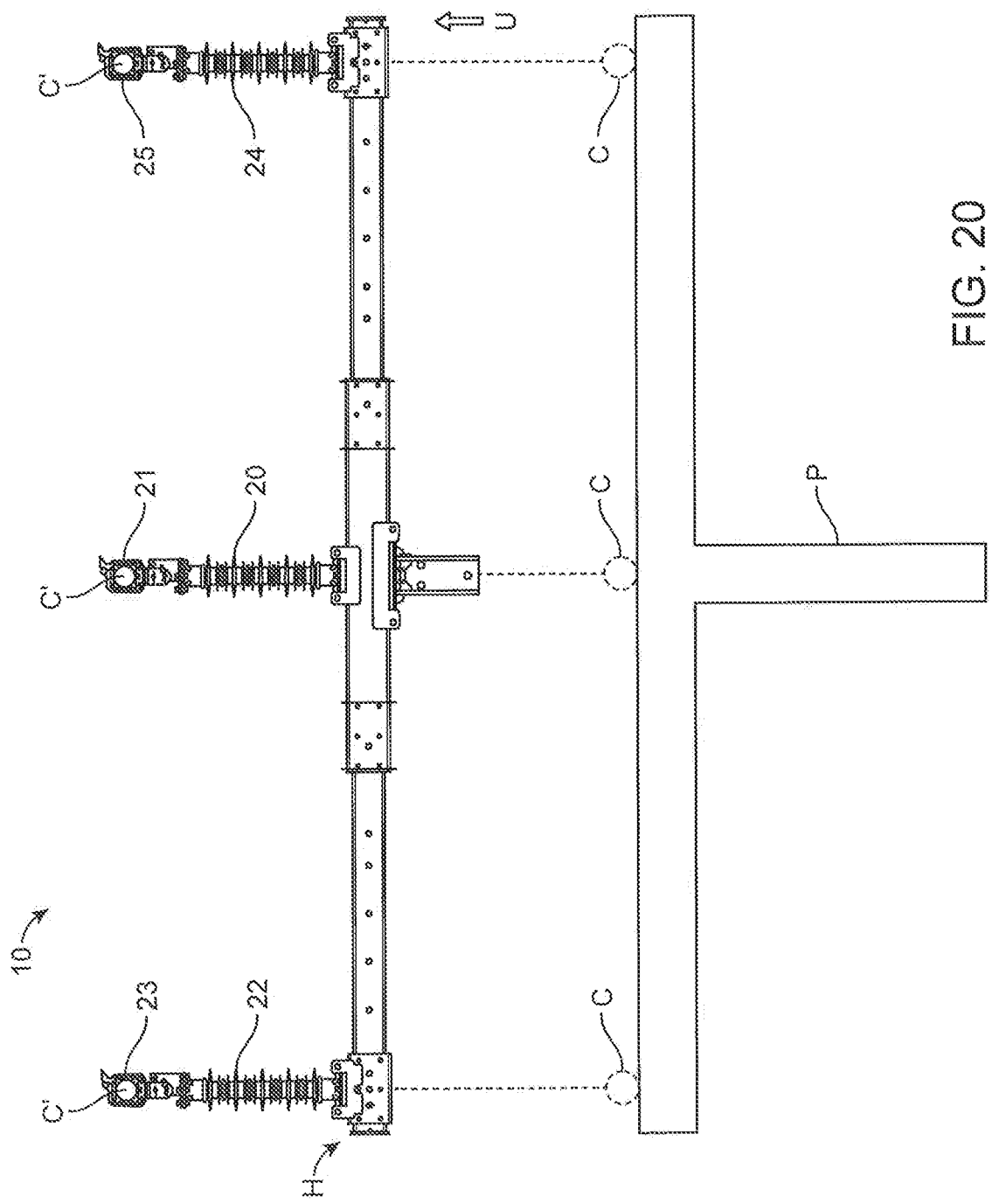
FIG. 20 illustrates the first embodiment of the conductor in a horizontal orientation being used to lift conductors in an upward direction away from a horizontal cross member of a power pole.

FIG. 20 illustrates the first embodiment of the conductor lift 10 being used to grasp and elevate multiple conductors C. As shown in FIG. 20, the conductor lift is in a horizontal orientation (H) and it has been used to move the conductors C in an upward direction (U) to new positions C' above the top horizontal cross-member of the power pole P. This is an illustration of how the conductor lift 10 may be used in a horizontal orientation H to move the conductors C in an upward direction U to a new position C' that is out of the way of work that may be done on the power pole P below.

Figure 21:
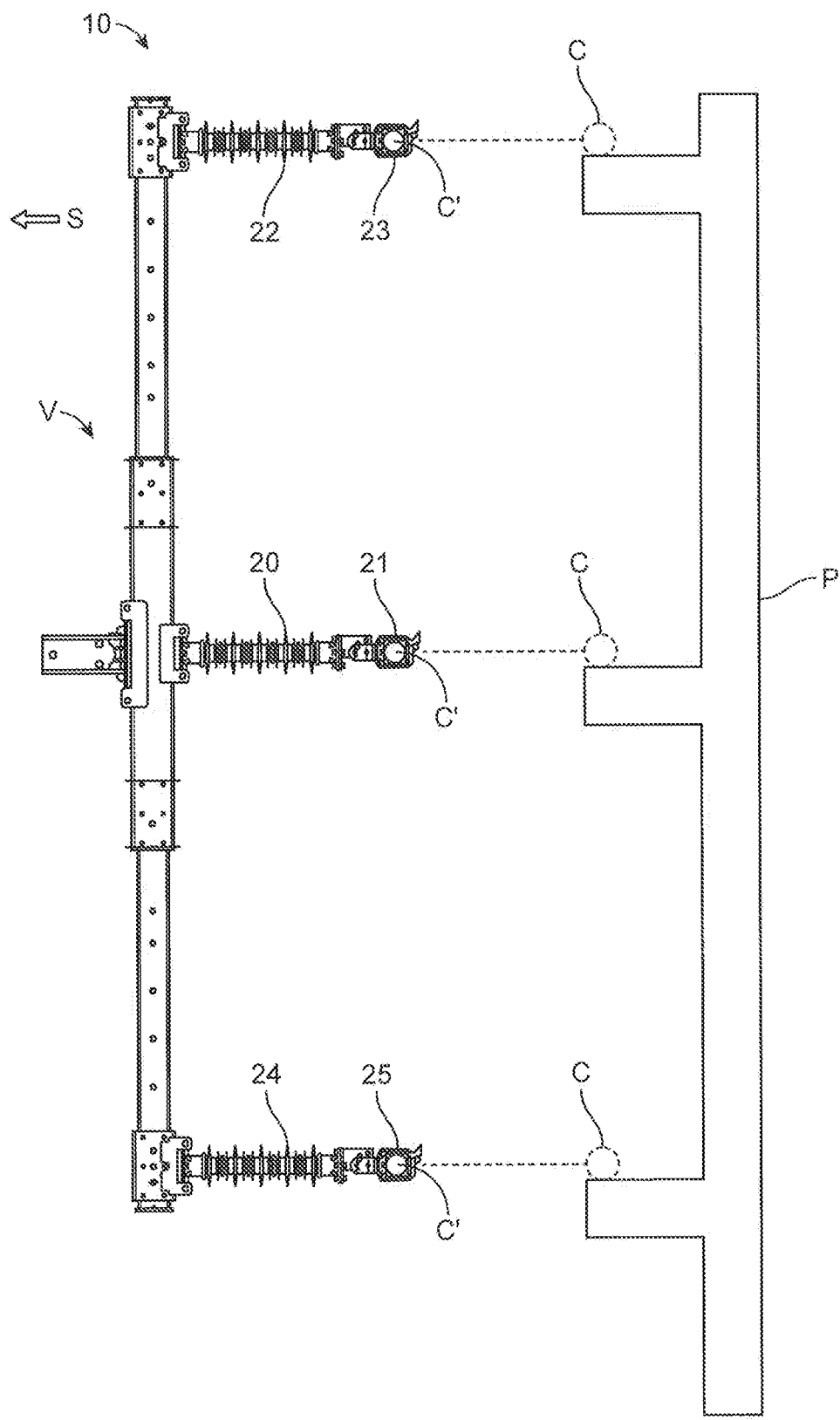
FIG. 21 illustrates the first embodiment of the conductor lift in a vertical orientation being used to pull conductors sideways away from a power pole.

FIG. 21 illustrates the first embodiment of the conductor life 10 being used to grasp and move multiple conductors C. As shown in FIG. 21, the conductor lift is in a vertical orientation (V) and it has been used to move the conductors C in a sideways direction (S) to new positions C' to the left side of the power pole P. This is an illustration of how the conductor lift 10 may be used in a vertical orientation V to move the conductors C in a sideways direction S to a new position C' that is out of the way of work that may be done on the power pole P to the right side of the lift 10.

Figure 22:
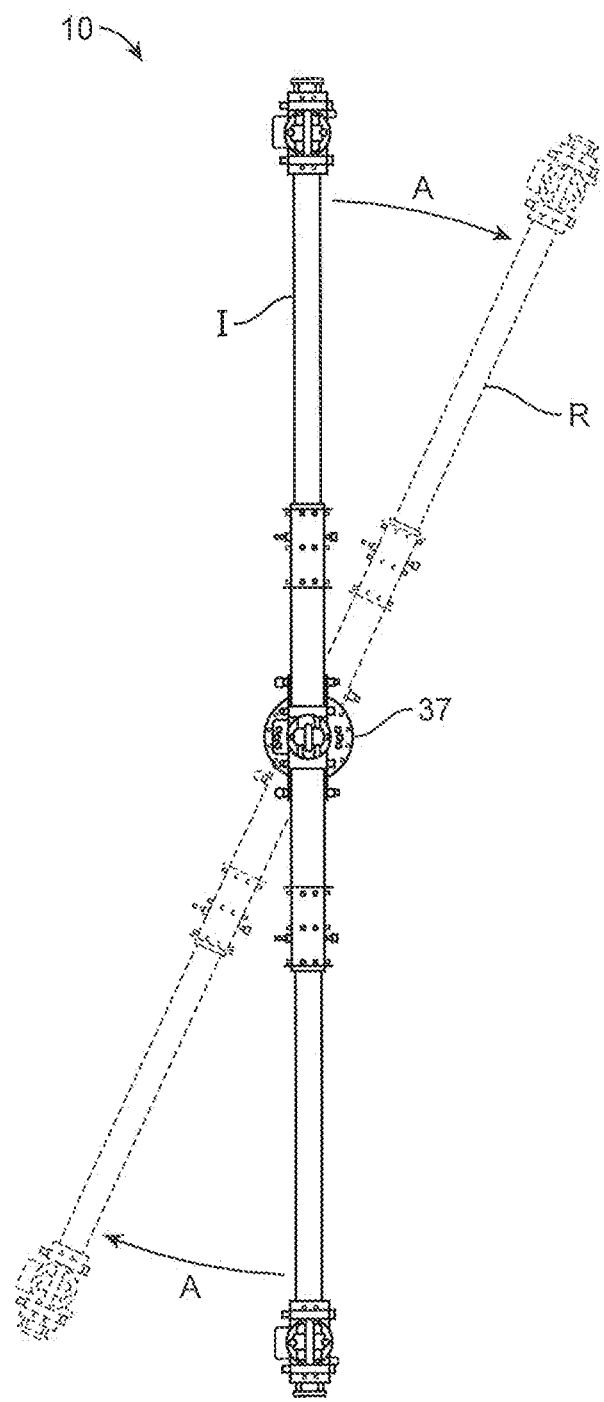
FIG. 22 again illustrates possible angular rotation of the conductor lift when using a mast subassembly incorporating an optional turntable.

FIG. 22 is intended to again illustrate the ability of the conductor lift 10 to be turned at an angle (A) from an initial position (I) to a rotated position (R). As discussed previously, this is made possible by the presence of a turntable 37 when it is part of the mast subassembly. As also previously discussed, the conductor lift 10 may be rotated up to an angle A of 30°.

Figure 23:
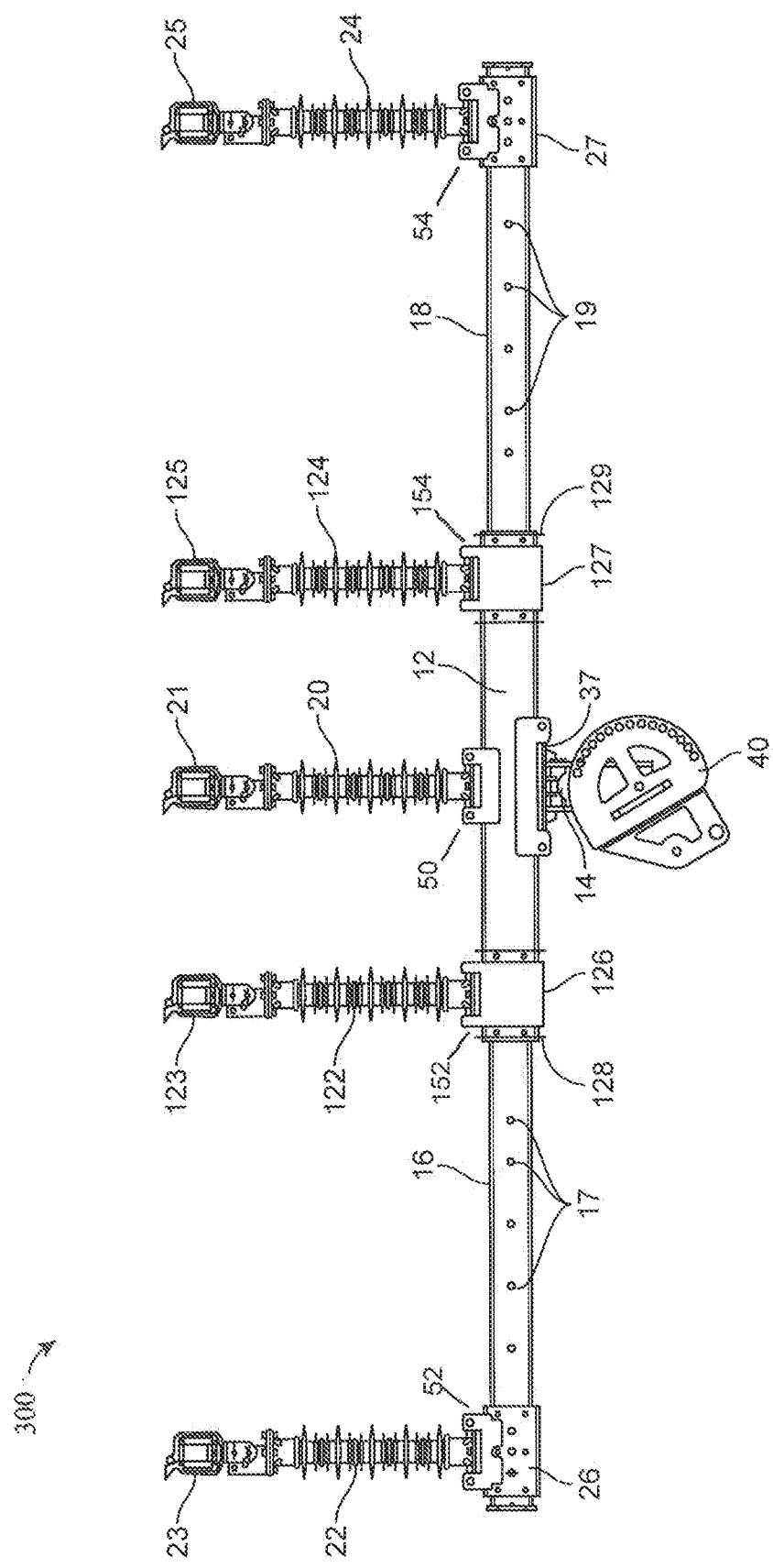
FIG. 23 illustrates third embodiment of the mobile conductor lift incorporating additional insulator stem subassemblies.

FIG. 23 illustrates a third potential embodiment of the conductor lift 300. This third embodiment incorporates up to an additional two insulator stem subassemblies comprised of insulator stems 122, 124, mounting bases 152, 154, and conductor holders 123, 125. The additional insulator stem subassemblies may be rigidly affixed to the ends of the central cross arm 12, but in a preferred embodiment they would be removably connected to the ends of the central cross arm 12 by mounting bases 152, 154 in the same or similar manner as the central insulator stem subassembly, i.e., using removable pins, screws, or bolts. These additional insulator stem subassemblies would be useful in situations where it is necessary to hold and/or move or manipulate additional lines, such as telecommunications lines, fiber optic cables, or static lines that are sometimes strung on power poles in addition to the conductors. Thus, it is contemplated that up to five separate insulator stem subassemblies could be removably attached to the conductor lift 300, but again with only the first and second side insulator stem subassemblies being capable of sliding movement to desired positions along the length of their respective extension arms 16, 18.

The second embodiment of the conductor lift 100 is particularly useful with regard to three-phase 25 kV-72.5 kV power distribution systems because a work crew of one to two workers can manipulate the attached energized or non-energized conductors by simply applying torque using an impact driver or other torqueing tool to the lead screws at the location of the gear boxes in order to move two of the conductors to helpful positions so that greater access may be had to the supports provided by the power pole or to the permanent insulators that connect the conductors to the power poles supports. As discussed previously, the extension arms of the first embodiment 16, 18 will normally be identical in construction. Likewise, the screw extension arms 56, 58 of the second embodiment will normally be identical in construction. The insulator stems 20, 22, 24 of both embodiments will normally be identical, the conductor holders 21, 23, 25 of both embodiments will normally be identical, and the arm sliders 26, 27 will normally be identical. As mentioned, they have been labelled separately in order to attempt to demonstrate the center and two separate sides of the lifts 10, 100 to facilitate a better understanding of the invention.

Also, as previously discussed, sliding movement of the arm sliders 26, 27 and the insulator stems 22, 24 attached thereto by means of the mounting bases 52, 54 may be accomplished by means other than the manual movement anticipated with the first embodiment of the lift 10 or mechanical movement inherent in the second embodiment of the lift 100. Other means such as hydraulic, pneumatic, or motorized mechanisms could be employed to bring about movement of the sliders and respective stems along the length of the extension arms or screw extension arms without departing from the scope of the invention.

Furthermore, whether the arm sliders 26, 27 of the various embodiments of the lift 10, 100, 300 may be brought into actual abutment with the ends of the central cross arm 12 will depend on the positioning of the extension arms 16, 18 or screw extension arms 56, 58 in relation to the central cross arm 12 when those arms are detachably connected thereto. In some instances the arm sliders 26, 27 may only be moved closer to the ends of the central cross arm 12 but may not be brought into actual abutment therewith if the extension arms 16, 18 or screw extension arms 56, 58 are pinned to the central cross arm 12 at a greater distance apart from one another. This would also be true in the second embodiment because the channel openings 97, 98 that run lengthwise along the screw extension arms 56, 58 do not extend along the entire length of their respective screw extension arms 56, 58.

To the extent that the term central cross 12 has been used herein, that has been done since in a preferred embodiment the central cross a 12 has an elongate shape. However, while the extension arms 16, 18 and screw extension arms 56, 58 are necessarily elongate structures or "arms," the central member of the conductor lift might be circular, disc shape, cuboidal or some other design that is not elongate and therefore not an "arm" like structure, and yet such other structures used as central members of the lift would not depart from the scope of the invention. Thus, in the claims appended hereto, the term "central frame" is used rather than "central cross arm" in order to make clear the inclusion of other types of designs or structures for the central member of the conductor lift beyond the arm structures shown in the drawings.

To the extent that the embodiments of the conductor lift 10, 100, 308 have been reduced to practice, the subassemblies of the conductor lift as built are no greater than eight feet long and they are capable of being stored inside the storage cube 200 that fits in the bed of a standard pickup truck. However, when the conductor lifts 10, 300 are assembled into a work-ready configuration, the span from the distal end of the first extension arm 16 to the distal end of the second extension arm 18 is at least sixteen feet such that the lift 10, 300 as-built may be used to hold and manipulate conductors that are p to sixteen feet apart. The same length between the ends of the assembled lift is also provided by the screw extension arms 56, 58 of the second embodiment of the lift 100.

Further, the terms "removably connected", "detachably connected", "detachably attached", "removably attached", and "removable connection" and other similar terms as used herein generally have the same meaning in that all such terms contemplate the use of removable conductors such as pins, screws, or bolts for detachably connecting subassemblies and their components when the lift is assembled into a work-ready configuration, with such pins, screws, or bolts being removable when it is desired to disassemble the lift and place the subassemblies into the accompanying storage cube for storage and/or transport.

The use of removable connectors to secure the main load-bearing members and the other subassemblies such as the insulator stem subassemblies is a significant improvement. The prior art has mostly relied upon insulator stems that clip in place, but the use of removable connectors such as pins, screws, and bolts provides better resistance to the load placed on the conductor lift as a result of tension in the conductors, especially in areas where the conductors are stretched at right angles or other unusual angles by power poles. When the pole at the center of the relevant angle needs work, the conductors connected to that pole are in tension and will pull away from the pole towards the surrounding poles, which causes the conductor lift to experience a greater load in those situations. Use of removable connectors such as pins, screws, and bolts to attach the insulator stem subassemblies allows for more load from such tension to be carried by the mobile conductor lift without the insulator stems breaking off or moving or sliding around in relation to the lift, as would often happen with the old clamped-on insulator stems. Each of the conductor holders of the lift 10, 100, 300 in a work-ready configuration is capable of holding at least up to a 500 lb. load.

It should also be noted that multiple conductors can potentially be held in each conductor holder of the lift device. This may not be immediately apparent from the drawings, but it is possible to hold more than one conductor in each of the conductor holders of the lift.

With regard to the arm sliders disclosed concerning the first embodiment of the lift 10, the arm sliders 26, 27 will typically have flat wear pads connected to their internal surfaces that face the surfaces of the extension arms 16, 18 in order to facilitate smooth movement along the lengths of the extension arms 16, 18. These wear pads can also be used with the arm sliders 26, 27 of the second embodiment of the lift 100. However, though such wear pads located intermediate of the arm sliders and the extension arms (or screw extension arms) are preferred due to their simplicity, it would also be possible to use wheels, rollers, or ball bearings between the sliders and the arms in order to facilitate smooth sliding action along the lengths of the arms. Regardless of whether wear pads, wheels, rollers or bearings were used, none of such alternatives would depart from the scope of the invention hereby disclosed.

The embodiments and other features, aspects, and advantages of the present invention may be best understood and appreciated with reference to the drawings, descriptions, and claims. Where used in the various figures of the drawings, the same numerals designate the same or similar parts. Furthermore, when the terms "top", "bottom", "front", "back", "distal", "proximal", "lateral", "vertical", "horizontal", "central", "first", "second", "third", "inside", "internal", "outside", "external", "end", "ends", "side", "sides", "edge", "edges" and similar terms are used herein, it should be understood that, unless otherwise specifically stated or otherwise made specifically clear by context, these terms have reference only to the structure shown in the drawings as it would appear to a person viewing the drawings, and such terms are utilized in order to facilitate describing the invention and in order to facilitate a better understanding of the invention.

Although the invention has been described with reference to three specific embodiments, this description is not meant to be construed in a limiting sense. Various modifications of the disclosed embodiments, as well as alternative embodiments of the invention, will be apparent to persons skilled in the art upon reference to the description of the invention. It is, therefore, contemplated that the appended cairns will cover such modifications that fall within the scope of the invention.

We claim:

1. A conductor lift that may be mounted to the boom of a crane, aerial lift, or transport vehicle that is comprised of:
   a central frame;
   an elongate first extension arm capable of slidable engagement with, and removable connection to, the central frame;
   at least a first removable connector capable of removably connecting one end of the first extension arm to the central frame;
   an elongate second extension arm capable of slidable engagement with, and removable connection to, the central frame;
   at least a second removable connector capable of removably connecting one end of the second extension arm to the central frame;
   wherein when the first extension arm and the second extension arm are each removably connected to the central frame, they cooperate to form a temporary assembly that is temporarily held together by removable connectors;
   wherein the temporary assembly will have a longitudinal axis spanning from the distal end of the first extension arm through the central frame and to the distal end of the second extension arm;
   and wherein the temporary assembly may be assembled or disassembled solely by means of manual labor by slidably engaging each of the extension arms to the central frame and then removably connecting each of the extension arms to the central frame using only removable connectors.

2. The conductor lift of claim 1 that is further comprised of:
an insulator stem that may be removably connected to the central frame;
an insulator stem that may be slidably engaged with the first extension arm and that is also configured for removable connection to the first extension arm at varying positions along the length of the first extension arm;
an insulator stem that may be slidably engaged with the second extension arm and that is also configured for removable connection to the second extension arm at varying positions along the length of the second extension arm;
wherein the respective insulator stems are not permanently connected to the central frame and the extension arms, but may be temporarily removably connected to the respective central frame, first extension arm, and second extension arms by means of removable connectors.

3. The conductor lift of claim 2 wherein when the respective insulator stems are removably connected to the first extension arm and the second extension arm at locations along the lengths of the respective extension arms, they are temporarily held in place and are temporarily incapable of slidable movement along the lengths of the respective extension arms to new positions.

4. The conductor lift of claim 3 further comprised of a means for mounting the conductor lift to the boom wherein the means for mounting is comprised of a mast that is capable of detachable connection to the central frame of the conductor lift and may also be detachably connected to the end of a boom.

5. The conductor lift of claim 4 wherein the means for mounting is further comprised of an articulation plate connected to the mast wherein the articulation plate may be detachably connected to the end of a boom but wherein such arrangement the mast will not be directly connected to the end of the boom.

6. The conductor lift of claim 5 wherein the means for mounting is further comprised of a turntable integral to the mast that is positioned intermediate of the base of the mast and the top of the mast.

7. A conductor lift that may be mounted to the boom of a crane, aerial lift, or transport vehicle comprising:
a means for mounting the conductor lift to a boom;
a central frame;
two elongate extension arms capable of slidable and removable connection to the central frame, each of which further includes an arm slider that is slidably connected to the extension arm;
three insulator stem subassemblies, each of which is comprised of at least an insulator stem and a conductor holder attached to the insulator stem;
wherein if the extension arms are slidably and removably connected to the central frame, the central frame and the two extension arms will cooperate to form an assembly that has a longitudinal axis running from a distal end of one of the extension arms through the central frame and to the distal end of the other extension arm.

8. The conductor lift of claim 7 further comprising:
means for detachably connecting one of the insulator stem subassemblies to each of the arm sliders and to the central frame;
means for detachably connecting the first extension arm and the second extension arm to the central frame so that they may be temporarily held in selected positions in relation to the central frame for as long as desired;
means for detachably connecting the each of the arm sliders to its respective extension arm so that the arm sliders may be temporarily held in a selected position in relation to the respective extension arms for as long as desired.

9. The conductor lift of claim 8 wherein the means for mounting the conductor lift to a boom is a mast that is detachably connected to the central frame of the conductor lift and may also be detachably connected to the end of a boom.

10. The conductor lift of claim 9 wherein the means for mounting also includes an articulation plate located between the mast and the end of a boom that is pivotably connected to the mast and may be detachably connected to the end of a boom.

11. The conductor lift of claim 10 wherein the means for mounting is further comprised of a turntable that is integral to the mast.

12. The conductor lift of claim 11 wherein the means for detachably connecting the arm sliders to the extension arms are a set of pins and a multiplicity of arm pin holes disposed along the lengths of the respective extension arms.

13. The conductor lift of claim 12 wherein the central frame is an elongate structure and wherein the first extension arm and the second extension arm are identical in structure but are slidably and removably connected to opposite ends of the central frame.

14. A conductor lift that may be mounted to the boom of a crane, aerial lift, or transport vehicle comprising:
a means for mounting the conductor lift to the boom;
a central frame;
an elongate first extension arm slidably connected to the central frame;
an elongate second extension arm slidably connected to the central frame;
a first arm slider slidably connected to the first extension arm;
a second arm slider slidably connected to the second extension arm;
a central insulator stem with a first end and a second end, wherein the first end is connected to the central cross arm and the second end of the central insulator stem is connected to a first conductor holder;
a first side insulator stem with a first end and a second end, the first end being interconnected to the first arm slider by means of a mounting base and the second end connected to a second conductor holder;
a second side insulator stem with a first end and a second end, the first end being interconnected to the second arm slider by means of a mounting base and the second end connected to a third conductor holder;
means for detachably connecting the first extension arm and the second extension arm to the central frame so that they may be held in selected positions in relation to the central frame for as long as desired;
means for detachably connecting the first arm slider to the first extension arm so that the first arm slider may be held in a selected position in relation to the first extension arm for as long as desired;

means for detachably connecting the second arm slider to the second extension arm so that the second arm slider may be held in a selected position in relation to the second extension arm for as long as desired;

actuation means for slidably moving the first arm slider along at least a portion of the length of the first extension arm;

actuation means for slidably moving the second arm slider along at least a portion of the length of the second extension arm.

15. The conductor lift of claim 14 wherein the first extension arm and second extension arm are comprised of hollow tubes that are slidably connected to the central frame.

16. The conductor lift of claim 15 wherein the actuation means for slidably moving the first arm slider along at least a portion of the length of the first extension arm is comprised of the following:
  an elongate first screw, the majority of which is housed within the hollow tube that comprises the first extension arm and is screwably connected on its distal end to a first gear box that is affixed to the distal end of the first extension arm;
  a first insulator carrier platform housed within the first extension arm and through which the first screw is screwably disposed;
  a first channel opening through the hollow tube that comprises the first extension arm that runs for at least a portion of the length of the first extension arm;
  wherein the first insulator carrier platform is removably attached to the first arm slider by removable connection means;
and wherein the actuation means for slidably moving the second arm slider along at least a portion of the length of the second extension arm is comprised of the following:
  an elongate second screw, the majority of which is housed within the hollow tube that comprises the second extension arm and is screwably connected on its distal end to a second gear box that is affixed to the distal end of the second extension arm;
  a second insulator carrier platform housed within the second extension arm and through which the second screw is screwably disposed;
  a second channel opening through the hollow tube that comprises the second extension arm that runs for at least a portion of the length of the second extension arm;
  wherein the second insulator carrier platform is removably attached to the second arm slider by removable connection means.

17. The conductor lift of claim 16 wherein the means for mounting is a mast that is detachably connected to the central frame of the conductor lift and may also be detachably connected to the end of a boom.

18. The conductor lift of claim 17 wherein the means for mounting further comprises an articulation plate that may be detachably connected to the end of a boom and is pivotably connected to the mast wherein the articulation plate allows the conductor lift to be pivoted toward and away from the main body of a connected boom.

19. The conductor lift of claim 18 wherein the means for mounting is further comprised of a turntable that is integral to the mast and that allows the conductor lift to be rotated at an angle in relation to the end of a boom.

20. The conductor lift of claim 19 wherein the actuation means for slidably moving the first arm slider along at least a portion of the length of the first extension arm further comprises:
  a first body interface affixed to the proximal end of the first extension arm within which the proximal end of the first screw is rotatably supported such that the first screw is supported on its proximal end by the first body interface and supported by and screwably connected to the first gear box on its distal end;
and wherein actuation means for slidably moving the second arm slider along at least a portion of the length of the second extension arm further comprises:
  a second body interface affixed to the proximal end of the second extension arm within which the proximal end of the second screw is rotatably supported such that the second screw is supported on its proximal end by the second body interface and supported by and screwably connected to the second gear box on its distal end.

21. The conductor lift of claim 20 wherein the actuation means for slidably moving the first arm slider along at least a portion of the length of the first extension arm further comprises:
  a first bottom shaft support affixed to the bottom of the internal surface of the hollow tube that comprises the first extension arm, wherein the first screw rotatably passes through an opening within the first bottom shaft support and the first bottom shaft support provides physical support to the first screw;
  a first top shaft support affixed to the top of the internal surface of the hollow tube that comprises the first extension arm, wherein the first screw rotatably passes through an opening within the first top shaft support and the first top shaft support provides physical support to the first screw;
and wherein actuation means for slidably moving the second arm slider along at least a portion of the length of the second extension arm further comprises:
  a second bottom shaft support affixed to the bottom of the internal surface of the hollow tube that comprises the second extension arm, wherein the second screw rotatably passes through an opening within the second bottom shaft support and the second bottom shaft support provides physical support to the second screw;
  a second top shaft support affixed to the top of the internal surface of the hollow tube that comprises the second extension arm, wherein the second screw rotatably passes through an opening within the second top shaft support and the second top shaft support provides physical support to the second screw.

22. A conductor lift that may be mounted to the boom of a crane, aerial lift, or transport vehicle that is comprised of:
  a central frame;
  two elongate extension arms that may be slidably and detachably connected to opposite ends of the central frame, and each of which is further comprised of an arm slider;
  three identical insulator slider stem subassemblies, each of which is comprised of at least an insulator stem and a conductor holder, and each of which is capable of detachable connection at its base to the central frame or the slider arms;
  wherein the insulator stem subassemblies when they are detachably connected to the arm sliders are slidable and repositionable along at least a portion of the length of the respective extension arms by means of sliding the arm sliders, but may also be temporarily held in a desired position in relation to the extension arms using removable connectors to detachably connect the arm sliders to their respective extension arms.

23. The conductor lift of claim 22 further comprising at least one additional insulator stem subassembly which may be detachably connected to the central frame.

24. The conductor lift of claim 23 wherein the conductor lift may be pivoted toward or away from a boom to which it may be detachably attached by means of an articulation plate.

25. The conductor lift of claim 24 wherein the conductor lift may be rotated at an angle in relation to a boom to which it may be detachably attached by means of a turntable.

26. The conductor lift of claim 25 wherein the conductor lift may alternatively be pivoted toward the boom to which it is detachably attached so that the conductor lift's main body is brought into parallel alignment with the boom, or may be pivoted away from the boom until the lift's main body is brought into orthogonal relationship with the boom, and wherein the conductor lift may also be rotated up to an angle of 30 degrees in either direction away from the longitudinal axis of a boom to which it is detachably attached.

27. A storage cube that can be used to house the central frame, extension arms, and insulator stem subassemblies of the conductor lift of claim 22, wherein the storage cube has separate labeled racks for stowing each of the parts of the conductor lift and has a rectangular footprint of no more than thirty-two square feet and further features skids at its base that may be used to pick up and move the storage cube with the aid of a forklift or front end loader.

\* \* \* \* \*